US012718147B2

(12) United States Patent
Hatakeyama et al.

(10) Patent No.: US 12,718,147 B2
(45) Date of Patent: Aug. 25, 2026

(54) RULE GENERATION APPARATUS, RULE GENERATION METHOD, AND NON-TRANSITORY COMPUTER READABLE MEDIUM STORING CONTROL PROGRAM

(71) Applicant: NEC Corporation, Tokyo (JP)

(72) Inventors: Yuta Hatakeyama, Tokyo (JP); Yuzuru Okajima, Tokyo (JP); Kunihiko Sadamasa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 776 days.

(21) Appl. No.: 18/019,912

(22) PCT Filed: Aug. 20, 2020

(86) PCT No.: PCT/JP2020/031387
§ 371 (c)(1),
(2) Date: Feb. 6, 2023

(87) PCT Pub. No.: WO2022/038729
PCT Pub. Date: Feb. 24, 2022

(65) Prior Publication Data
US 2023/0214717 A1 Jul. 6, 2023

(51) Int. Cl.
*G06F 18/214* (2023.01)
*G06N 20/00* (2019.01)

(52) U.S. Cl.
CPC .......... *G06N 20/00* (2019.01); *G06F 18/214* (2023.01)

(58) Field of Classification Search
CPC .............................. G06F 18/214; G06N 20/00
See application file for complete search history.

(56) References Cited

U.S. PATENT DOCUMENTS 6,643,646 B2 * 11/2003 Su ........................ G06F 16/2465
7,836,004 B2 * 11/2010 Roth ..................... G06F 16/215 706/47
11,537,880 B2 * 12/2022 Kursun ................ G06N 3/0455
(Continued)

FOREIGN PATENT DOCUMENTS

JP 2019-053491 A 4/2019

OTHER PUBLICATIONS

International Search Report for PCT Application No. PCT/JP2020/031387, mailed on Nov. 10, 2020.
(Continued)

*Primary Examiner* — Beau D Spratt
(74) *Attorney, Agent, or Firm* — Sughrue Mion, PLLC

(57) ABSTRACT

In a rule generation apparatus, a rule generation unit generates a rule group for dividing a training example into a plurality of clusters related to target values using a rule base model so that a "first constraint" is satisfied. The training example includes at least one real example and at least one synthetic example. Each of the real and the synthetic examples includes a feature value vector of which vector elements are one or a plurality of feature values corresponding to feature parameters different from each other, and a target value. The feature value and the target value included in each of the real examples are measured values, while each of the synthetic examples is an example formed based on the real example. The "first constraint" includes a constraint that each of the clusters includes at least N (N is a natural number) real example.

8 Claims, 22 Drawing Sheets

(56) References Cited

U.S. PATENT DOCUMENTS

| | | | | |
|---|---|---|---|---|
| 2008/0104007 | A1* | 5/2008 | Bala | G06F 18/24323 706/59 |
| 2021/0042575 | A1* | 2/2021 | Firner | G05D 1/0088 |
| 2021/0201464 | A1* | 7/2021 | Tariq | G06V 20/56 |
| 2023/0010686 | A1* | 1/2023 | Lesh | G16H 50/70 |

OTHER PUBLICATIONS

Cristian Bucila et al., "Model Compression", In Proceedings of the 12th ACM SIGKDD International Conference on Knowledge Discovery and Data Mining, KDD'06, pp. 535-541, New York, NY, USA, 2006, ACM.

* cited by examiner

| | | FEATURE VALUE | | | TARGET VALUE |
|---|---|---|---|---|---|
| | EXAMPLE ID | OBSERVATION DATE | HUMIDITY | WEATHER | AIR TEMPERATURE |
| REAL EXAMPLE | E0 | AUGUST | 56.8% | CLOUDY | 23.7°C |
| REAL EXAMPLE | E1 | APRIL | 33.5% | SUNNY | 15.5°C |
| REAL EXAMPLE | E2 | FEBRUARY | 36.6% | CLOUDY | 3.7°C |
| SYNTHETIC EXAMPLE | E3 | AUGUST | 45.2% | SUNNY | 28.9°C |
| SYNTHETIC EXAMPLE | E4 | JUNE | 77.9% | RAIN | 18.1°C |

Fig. 4

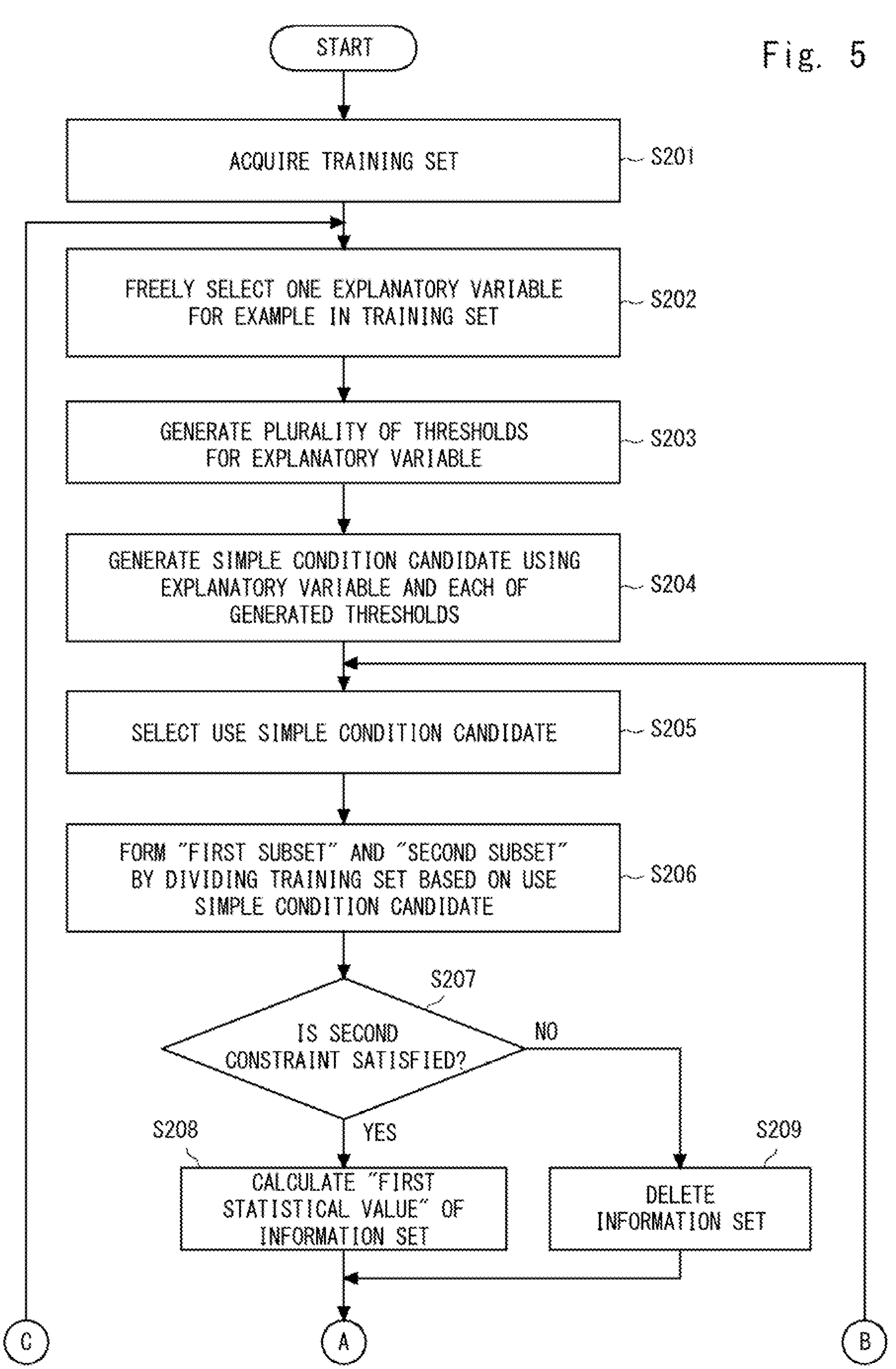

Fig. 5
START
ACQUIRE TRAINING SET
S201
FREELY SELECT ONE EXPLANATORY VARIABLE FOR EXAMPLE IN TRAINING SET
S202
GENERATE PLURALITY OF THRESHOLDS FOR EXPLANATORY VARIABLE
S203
GENERATE SIMPLE CONDITION CANDIDATE USING EXPLANATORY VARIABLE AND EACH OF GENERATED THRESHOLDS
S204
SELECT USE SIMPLE CONDITION CANDIDATE
S205
FORM "FIRST SUBSET" AND "SECOND SUBSET" BY DIVIDING TRAINING SET BASED ON USE SIMPLE CONDITION CANDIDATE
S206
S207
IS SECOND CONSTRAINT SATISFIED?
NO
YES
S208
CALCULATE "FIRST STATISTICAL VALUE" OF INFORMATION SET
S209
DELETE INFORMATION SET
C
A
B

Figure 8:
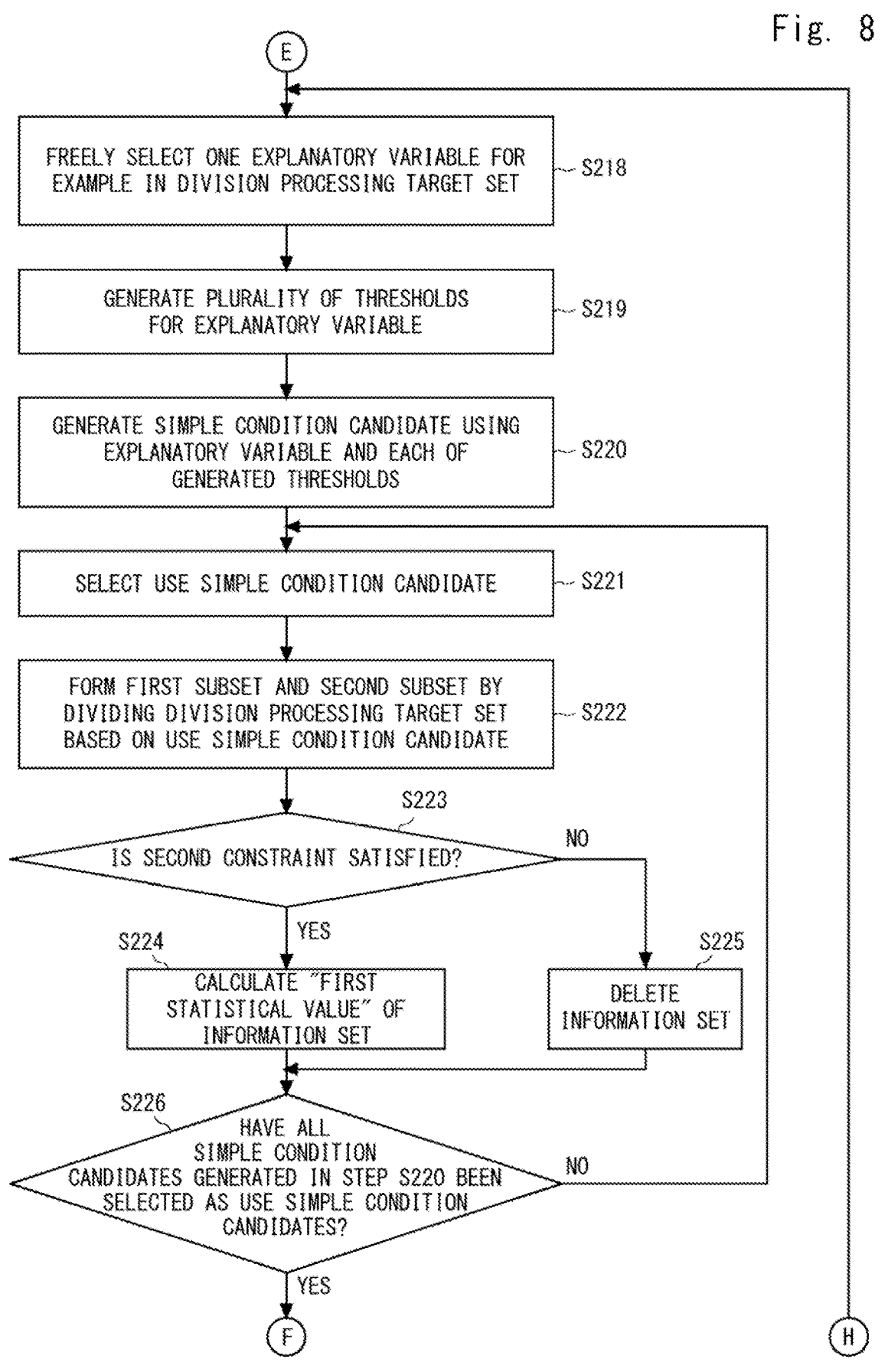

FREELY SELECT ONE EXPLANATORY VARIABLE FOR EXAMPLE IN DIVISION PROCESSING TARGET SET — S218

GENERATE PLURALITY OF THRESHOLDS FOR EXPLANATORY VARIABLE — S219

GENERATE SIMPLE CONDITION CANDIDATE USING EXPLANATORY VARIABLE AND EACH OF GENERATED THRESHOLDS — S220

SELECT USE SIMPLE CONDITION CANDIDATE — S221

FORM FIRST SUBSET AND SECOND SUBSET BY DIVIDING DIVISION PROCESSING TARGET SET BASED ON USE SIMPLE CONDITION CANDIDATE — S222

S223 IS SECOND CONSTRAINT SATISFIED?

YES

NO

S224 CALCULATE "FIRST STATISTICAL VALUE" OF INFORMATION SET

S225 DELETE INFORMATION SET

S226 HAVE ALL SIMPLE CONDITION CANDIDATES GENERATED IN STEP S220 BEEN SELECTED AS USE SIMPLE CONDITION CANDIDATES?

NO

YES

F

H

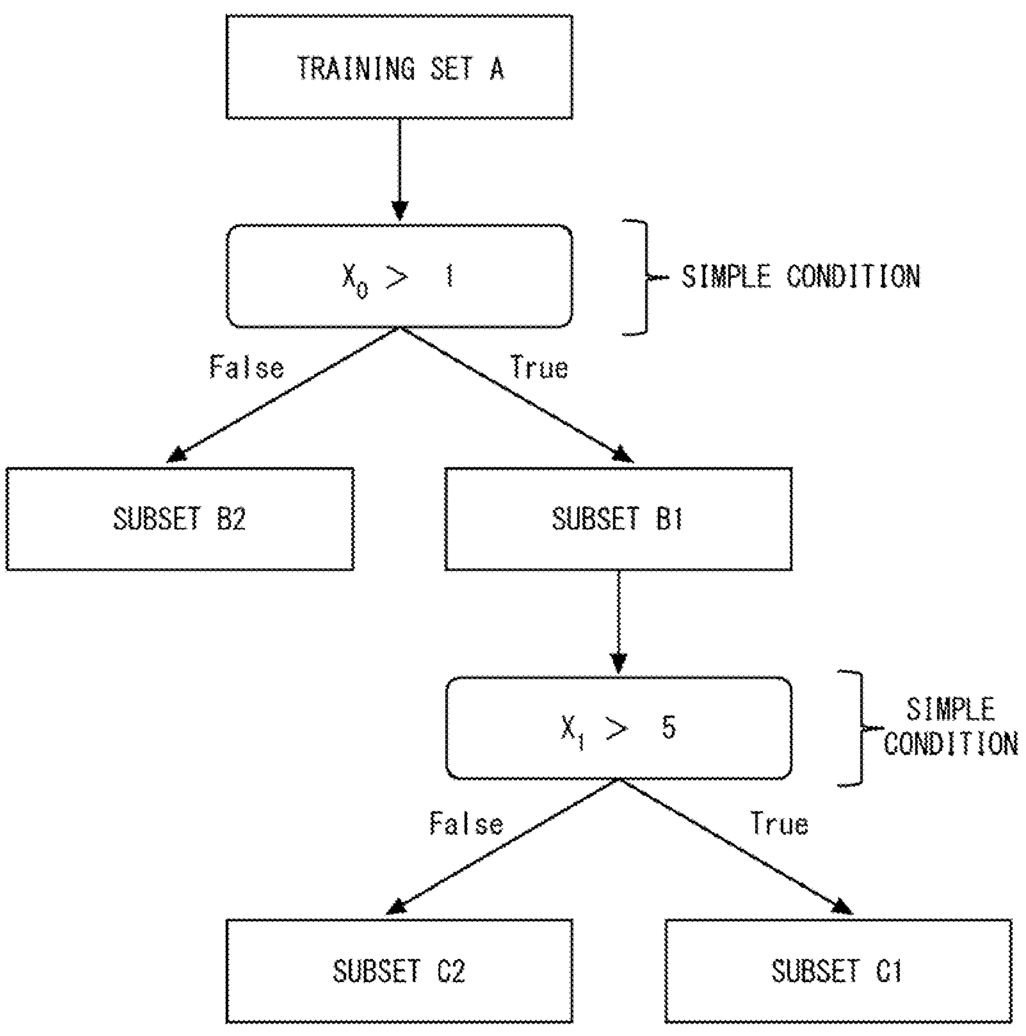
B2, C1, AND C2 SATISFY END CONDITION
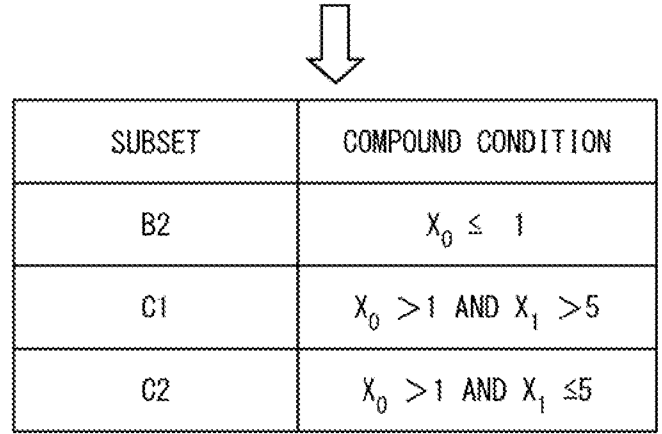
| SUBSET | COMPOUND CONDITION |
| --- | --- |
| B2 | $X_0 \leq 1$ |
| C1 | $X_0 > 1$ AND $X_1 > 5$ |
| C2 | $X_0 > 1$ AND $X_1 \leq 5$ |
Fig. 11

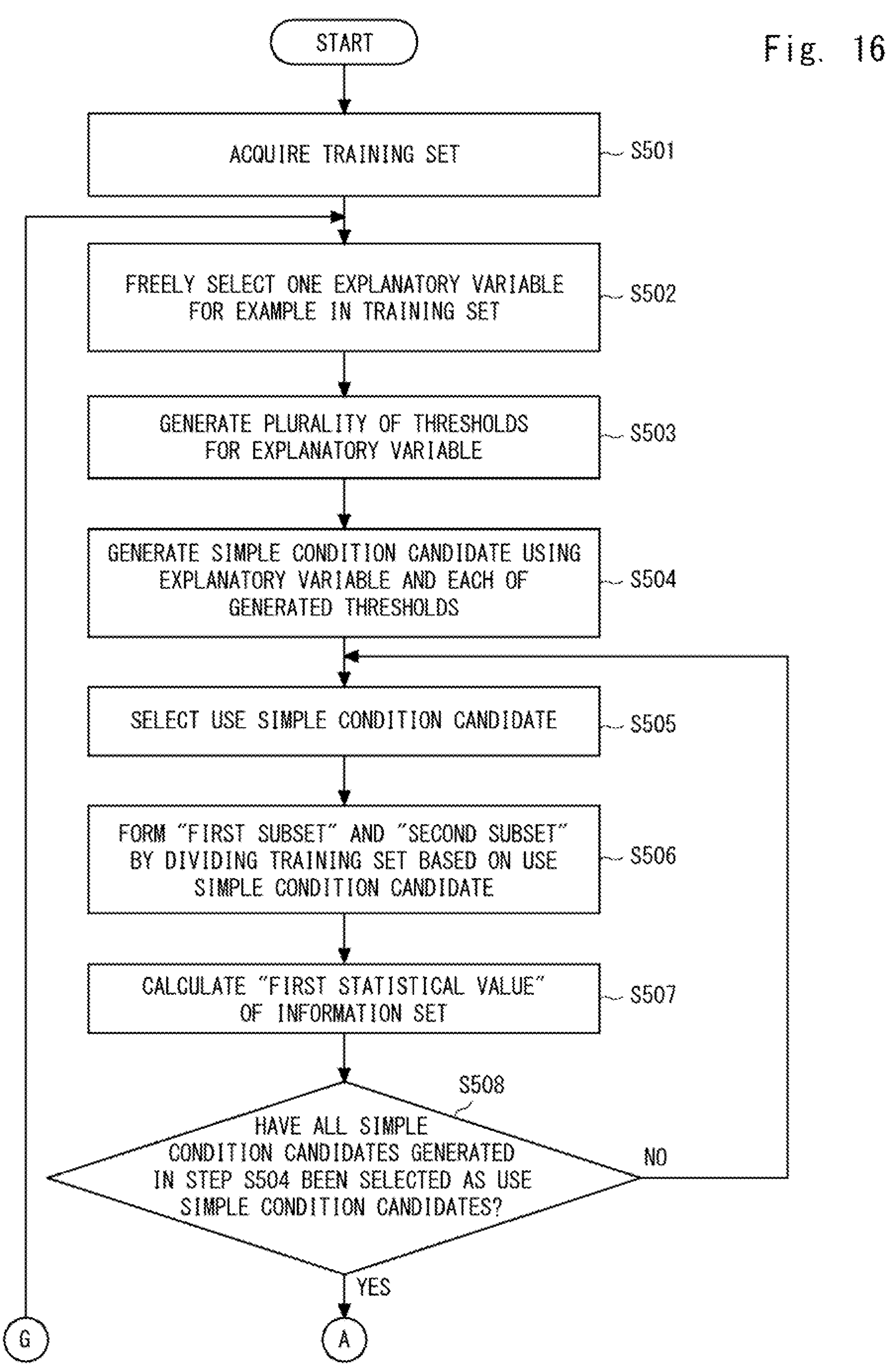
Fig. 16
START
ACQUIRE TRAINING SET
S501
FREELY SELECT ONE EXPLANATORY VARIABLE FOR EXAMPLE IN TRAINING SET
S502
GENERATE PLURALITY OF THRESHOLDS FOR EXPLANATORY VARIABLE
S503
GENERATE SIMPLE CONDITION CANDIDATE USING EXPLANATORY VARIABLE AND EACH OF GENERATED THRESHOLDS
S504
SELECT USE SIMPLE CONDITION CANDIDATE
S505
FORM "FIRST SUBSET" AND "SECOND SUBSET" BY DIVIDING TRAINING SET BASED ON USE SIMPLE CONDITION CANDIDATE
S506
CALCULATE "FIRST STATISTICAL VALUE" OF INFORMATION SET
S507
S508
HAVE ALL SIMPLE CONDITION CANDIDATES GENERATED IN STEP S504 BEEN SELECTED AS USE SIMPLE CONDITION CANDIDATES?
NO
YES
G
A

RULE GENERATION APPARATUS, RULE GENERATION METHOD, AND NON-TRANSITORY COMPUTER READABLE MEDIUM STORING CONTROL PROGRAM

This application is a National Stage Entry of PCT/JP2020/031387 filed on Aug. 20, 2020, the contents of all of which are incorporated herein by reference, in their entirety.

TECHNICAL FIELD

The present disclosure relates to a rule generation apparatus, a rule generation method, and a non-transitory computer readable medium.

BACKGROUND ART

In the field of machine learning, there is a method for training a model using a "training example" including "real examples" and "synthetic examples" (e.g., Non Patent Literature 1). The "training example" can also be referred to as a "training set" since it is a set of examples used for training (learning). A "real example" is an example that has actually been observed, while a "synthetic example" is an example that has been artificially formed. In Non Patent Literature 1, the synthetic example is formed based on the real example. This configuration allows a model to be trained using the synthetic examples in addition to the real examples, thus improving the accuracy of a model. Note that, in the following description, a "real example" and a "synthetic example" may be simply referred to as "examples" without being distinguished from each other.

Regarding a model, there is a "rule-based model (hereinafter, it may be simply referred to as a 'rule base model')", such as a decision tree and a decision list. In the "rule base model", each "rule" can be expressed in the form of IF-THEN, and a "condition set" and a "predicted value" that is obtained when the condition obtained from this condition set is satisfied are included.

CITATION LIST

Non Patent Literature

Non Patent Literature 1: Bucilua, Cristian, Caruana, Rich, and Niculescu-Mizil, Alexandru, "Model Compression". In Proceedings of the 12th ACMSIGKDD International Conference on Knowledge Discovery and Data Mining, KDD'06, pages 535-541, New York, NY, USA, 2006. ACM.

SUMMARY OF INVENTION

Technical Problem

The inventors of the present disclosure have found that when a rule base model is trained using a training example including real and synthetic examples, the accuracy of a rule may be improved but the "explanation property (interpretation property)" of the rule may be reduced. That is, when a rule base model is trained using a plurality of real examples, a plurality of examples are divided into a plurality of "groups (hereinafter may be referred to as 'clusters')" in accordance with the conditions obtained from the condition set of each rule. The aggregate result obtained by totaling "target values" of the respective examples included in each of the clusters are "predicted values" of the clusters. Therefore, when a rule base model is trained using a plurality of real examples without using synthetic examples, a user checks the respective real examples in the clusters and compares the aggregated result obtained by totaling the target values of the real examples in the clusters with the predicted values obtained by the rule base model, whereby it is possible to verify the validity of the rule obtained by the rule base model. However, when a rule base model is trained using a training example including real and synthetic examples, the clusters may include only synthetic examples while it may not include real examples. In this case, it is not possible to verify the validity of the rule obtained by the rule base model.

An object of the present disclosure is to provide a rule generation apparatus, a rule generation method, and a non-transitory computer readable medium that are capable of improving the explanation property of a rule.

Solution to Problem

A rule generation apparatus according to a first example aspect includes:

acquisition means for acquiring a training example including a plurality of examples, in which the plurality of examples include at least one real example and at least one synthetic example, each of the real example and the synthetic example includes a feature value vector of which vector elements are one or a plurality of feature values corresponding to feature parameters different from each other, and a target value, and the feature value and the target value included in each of the real examples are measured values, while each of the synthetic examples is an example formed based on the real example; and rule generation means for generating a rule group for dividing the training example into a plurality of clusters related to the target values using a rule base model so that a first constraint is satisfied, in which each of rules in the rule group includes a condition obtained from a condition set including at least one simple condition related to the feature parameters and a predicted value related to the target values, in which the first constraint includes a constraint that each of the clusters includes at least N (N is a natural number) real example.

A rule generation method according to a second example aspect includes acquiring a training example including a plurality of examples, in which the plurality of examples include at least one real example and at least one synthetic example, each of the real example and the synthetic example includes a feature value vector of which vector elements are one or a plurality of feature values corresponding to feature parameters different from each other, and a target value, and the feature value and the target value included in each of the real examples are measured values, while each of the synthetic examples is an example formed based on the real example, the rule generation method further including generating a rule group for dividing the training example into a plurality of clusters related to the target values using a rule base model so that a first constraint is satisfied, in which each of rules in the rule group includes a condition obtained from a condition set including at least one simple condition related to the feature parameters and a predicted value related to the target values, in which the first constraint includes a constraint that each of the clusters includes at least N (N is a natural number) real example.

A non-transitory computer readable medium according to a third example aspect stores a control program for causing a rule generation apparatus to perform processing comprising acquiring a training example including a plurality of examples, in which the plurality of examples include at least one real example and at least one synthetic example, each of the real example and the synthetic example includes a feature value vector of which vector elements are one or a plurality of feature values corresponding to feature parameters different from each other, and a target value, and the feature value and the target value included in each of the real examples are measured values, while each of the synthetic examples is an example formed based on the real example, the processing further comprising generating a rule group for dividing the training example into a plurality of clusters related to the target values using a rule base model so that a first constraint is satisfied, in which each of rules in the rule group includes a condition obtained from a condition set including at least one simple condition related to the feature parameters and a predicted value related to the target values, in which the first constraint includes a constraint that each of the clusters includes at least N (N is a natural number) real example.

Advantageous Effects of Invention

According to the present disclosure, it is possible to provide a rule generation apparatus, a rule generation method, and a non-transitory computer readable medium that are capable of improving the explanation property of a rule.

BRIEF DESCRIPTION OF DRAWINGS

FIG. 4 is a diagram used for explaining a training example;

FIG. 5 is a flowchart showing an example of condition generation processing according to the second example embodiment;

FIG. 8 is a flowchart showing an example of the condition generation processing according to the second example embodiment;

FIG. 11 is a diagram for explaining a processing result of the condition generation processing;

FIG. 16 is a flowchart showing an example of condition generation processing according to the fourth example embodiment;

EXAMPLE EMBODIMENT

Example embodiments will be described hereinafter with reference to the drawings. Note that the same or equivalent components will be denoted by the same reference symbols throughout the example embodiments, and redundant descriptions will be omitted.

First Example Embodiment

<Example of Configuration of Rule Generation Apparatus>

Figure 1:
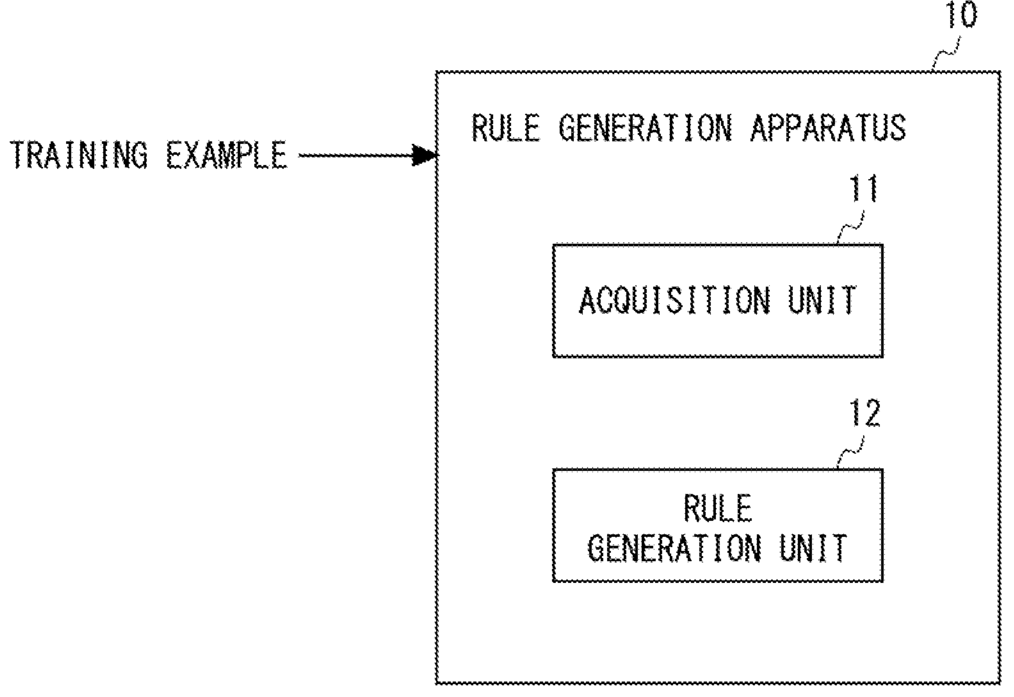
FIG. 1 is a block diagram showing an example of a rule generation apparatus according to a first example embodiment.

FIG. 1 is a block diagram showing an example of a rule generation apparatus according to a first example embodiment. In FIG. 1, a rule generation apparatus 10 includes an acquisition unit 11 and a rule generation unit 12. Note that, although the rule generation apparatus 10 is applicable to both regression and classification problems, the following description will be given in accordance with the assumption that it is mainly applied to a regression problem.

The acquisition unit 11 acquires a "training example (a training set)". The "training examples" include at least one "real example" and at least one "synthetic example". In the following description, the "real example" and the "synthetic example" may be simply referred to as "examples" without being distinguished from each other. Each example includes a "feature value vector", in which one or more "feature values" corresponding to "feature parameters" different from each other are set as "vector elements", and a "target value". For example, when one example is an "observation date: August", a "humidity: 56.8%", "weather: cloudy", and an "air temperature: 23.7° C.", each of the "observation date", the "humidity", and the "weather" can be set as a feature parameter, and (August, 56.8%, cloudy) can be set as a feature value vector. Further, "23.7° C." can be set a target value.

The feature values and the target values included in each of the real examples are "measured values" obtained by actually measuring (observing) an actual object to be predicted by a machine learning model. On the other hand, each synthetic example is an example formed based on a real example. For example, the synthetic example is formed by algorithms so that it resembles the real example. This synthetic example may be formed, for example, by the method disclosed in the aforementioned Non Patent Literature 1. That is, the synthetic example can be referred to as a pseudo example. Therefore, it is highly likely that a feature value and a target value of the real example are close to a feature value and a target value of the synthetic example. However, the feature value and the target value of the real example do not coincide with the feature value and the target value of the synthetic example.

The rule generation unit 12 generates a "rule group" for dividing a plurality of examples included in the training example into a plurality of groups (hereinafter, these groups are referred to as "clusters") related to the target values using a "rule base model" so that a "first constraint" is satisfied. The "rule base model" is a decision tree, a decision list, or the like as described above.

Each rule in the generated "rule group" includes a "condition (hereinafter may be referred to as a 'compound condition')" obtained from a "condition set" and a "predicted value related to the target values". The "condition set" includes one or more "simple conditions" related to feature parameters. Note that the "simple condition" means a condition for dividing one "parent node" into a plurality of "child nodes" in the "rule base model".

The "first constraint" includes a constraint that each of the clusters includes at least N (N is a natural number) real example. An example of a case in which N=1 will be described below.

<Operation Example of Rule Generation Apparatus>

Figure 2:
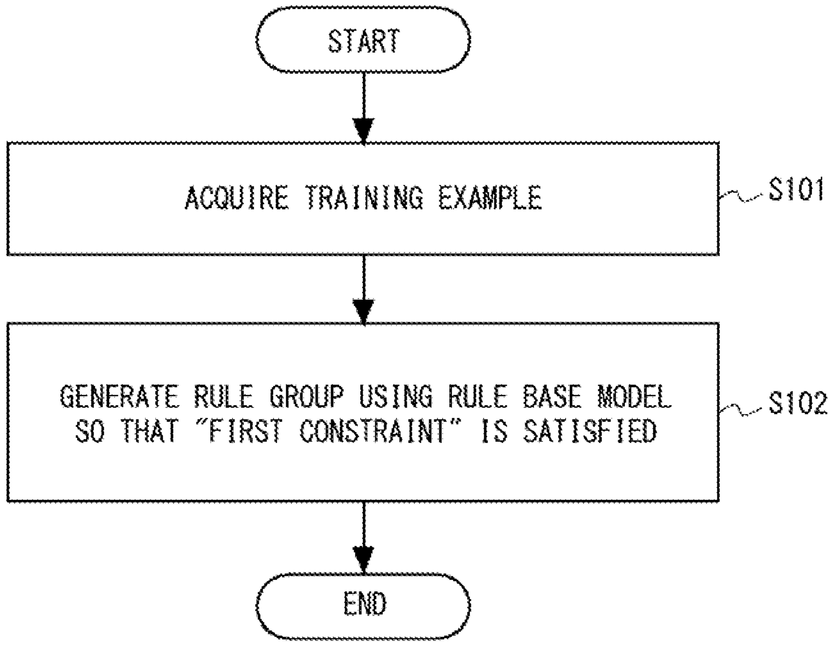
FIG. 2 is a flowchart showing an example of a processing operation of the rule generation apparatus according to the first example embodiment.

FIG. 2 is a flowchart showing an example of a processing operation of the rule generation apparatus according to the first example embodiment.

The acquisition unit 11 acquires a training example (Step S101).

The rule generation unit 12 generates a rule group using a rule base model so that a "first constraint" is satisfied (Step S102). The "first constraint" includes a constraint that each cluster includes at least one real example.

According to the first example embodiment described above, in the rule generation apparatus 10, the rule generation unit 12 generates a rule group for dividing the training example into a plurality of clusters related to the target values using the rule base model so that the first constraint is satisfied. The first constraint includes a constraint that each cluster includes at least N (N is a natural number) real example.

By the configuration of the above-described rule generation apparatus 10, each of the plurality of clusters divided by the generated rule group includes at least one real example. Therefore, the validity of the rule can be verified using this real example. That is, the explanation property of the rule can be improved. Further, since the above-described training examples include synthetic examples in addition to real examples, the accuracy of the rule can be improved as a matter of course.

Second Example Embodiment

A second example embodiment relates to a more specific example embodiment.

<Example of Configuration of Rule Generation Apparatus>

Figure 3:
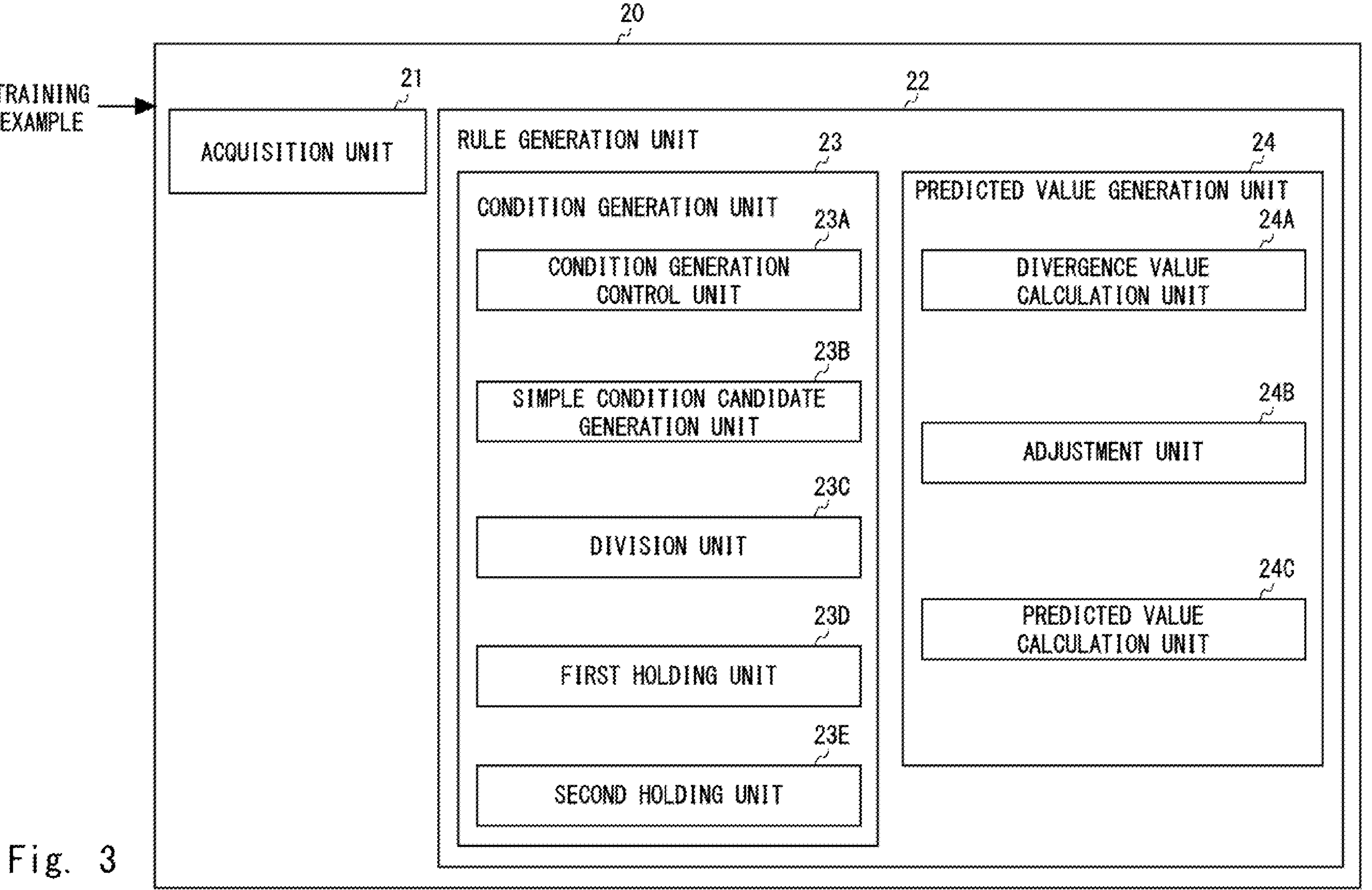
FIG. 3 is a block diagram showing an example of a rule generation apparatus according to a second example embodiment.
Figure 6:
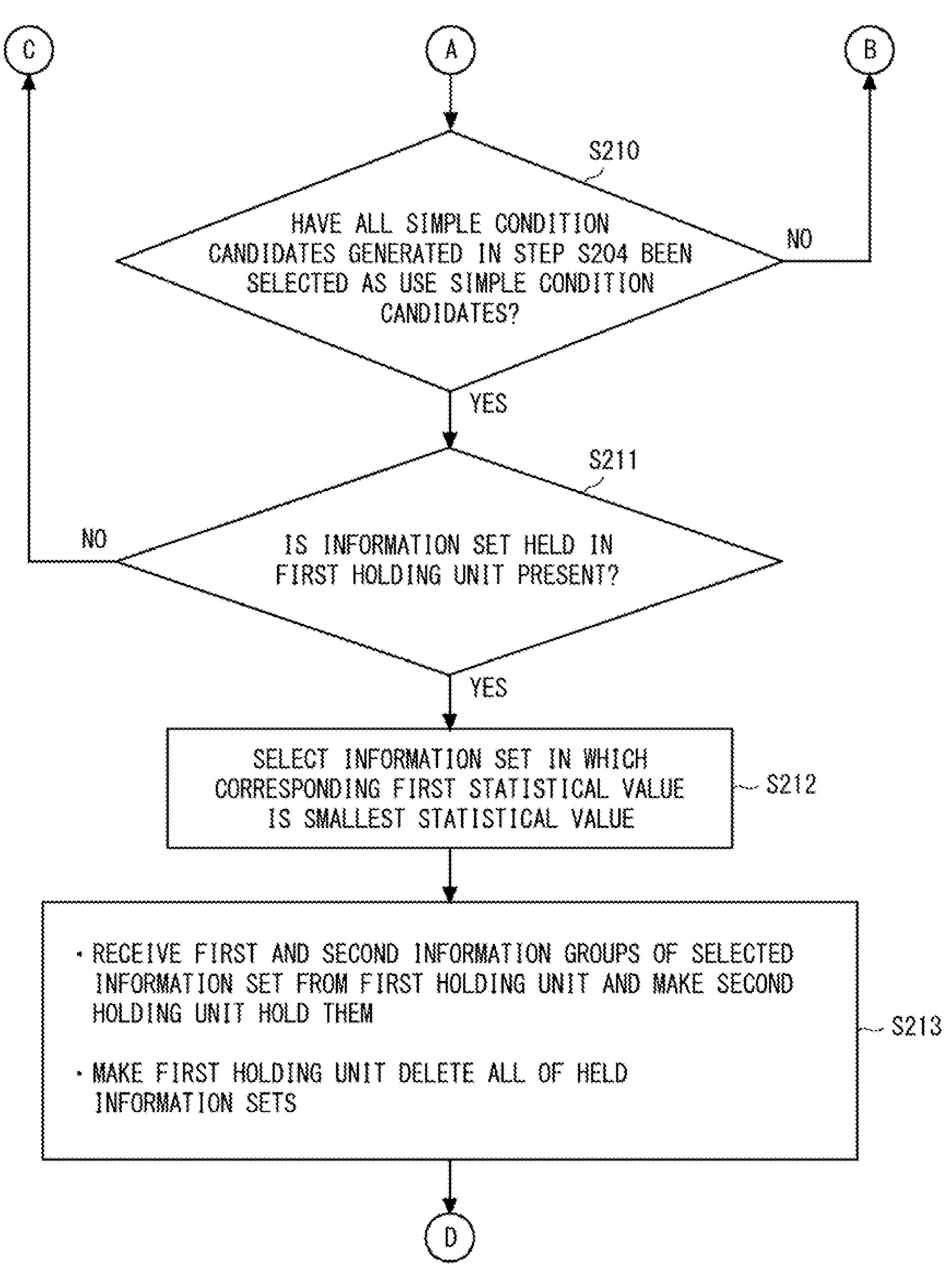
FIG. 6 is a flowchart showing an example of the condition generation processing according to the second example embodiment.
Figure 7:
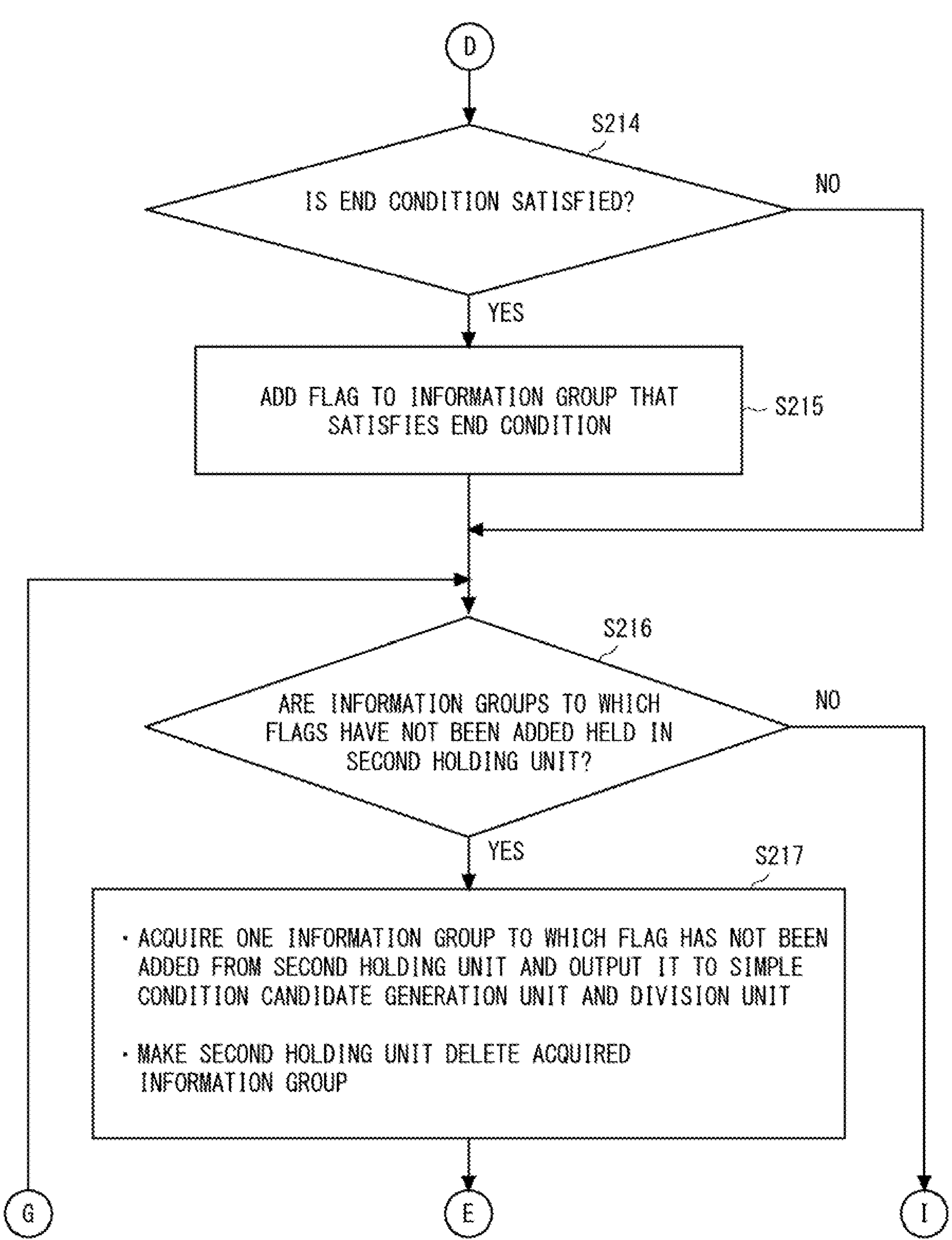
FIG. 7 is a flowchart showing an example of the condition generation processing according to the second example embodiment.
Figure 9:
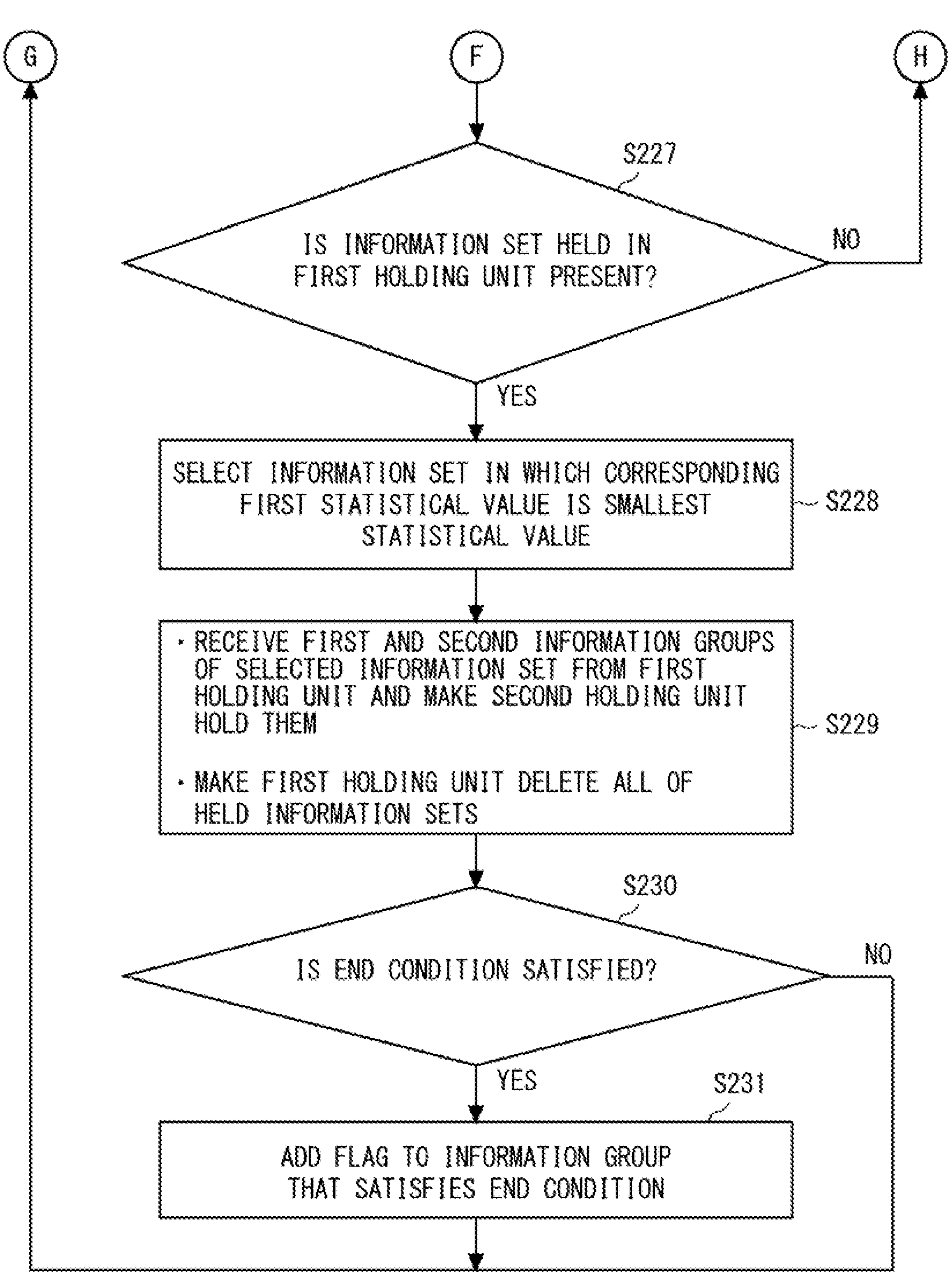
FIG. 9 is a flowchart showing an example of the condition generation processing according to the second example embodiment.
Figure 10:
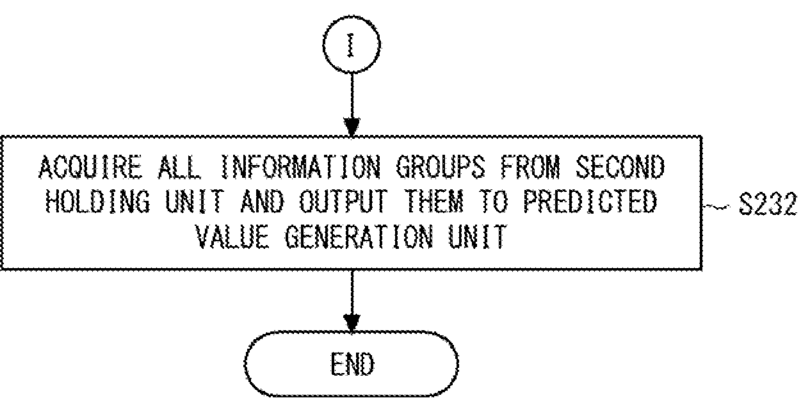
FIG. 10 is a flowchart showing an example of the condition generation processing according to the second example embodiment.

FIG. 3 is a block diagram showing an example of a rule generation apparatus according to the second example embodiment. In FIG. 3, a rule generation apparatus 20 includes an acquisition unit 21 and a rule generation unit 22. Note that, although the rule generation apparatus 20 is applicable to both regression and classification problems, the following description will be given in accordance with the assumption that it is mainly applied to a regression problem.

The acquisition unit 21, like the acquisition unit 11 according to the first example embodiment, acquires a training example (training set)". FIG. 4 is a diagram used for explaining the training example. In FIG. 4, for the sake of convenience, the training example is shown in the form of a table. The training example shown in FIG. 4 includes five examples. Three of these examples, that is, examples IDs are E0, E1, and E2, are real examples, and two of these examples, that is, examples IDs are E3 and E4, are synthetic examples. An "Observation date", a "Humidity", and "Weather" are respective feature parameters. Further, each example includes feature values respectively corresponding to the feature parameters. Further, an "Air temperature" is a target value parameter. Further, each example includes a target value corresponding to the target value parameter.

Returning to the description of FIG. 3, the rule generation unit 22, like the rule generation unit 12 according to the first example embodiment, generates a "rule group" for dividing a plurality of examples included in the training example into a plurality of clusters related to the target values using a "rule base model" so that a "first constraint" is satisfied.

For example, the rule generation unit 22 includes a condition generation unit 23 and a predicted value generation unit 24.

The condition generation unit 23 generates a condition for each rule.

For example, the condition generation unit 23 includes a condition generation control unit 23A, a simple condition candidate generation unit 23B, a division unit 23C, a first holding unit 23D, and a second holding unit 23E. Note that, although a description is given in accordance with the assumption that the first holding unit 23D and the second holding unit 23E are included in the condition generation unit 23, this example embodiment is not limited thereto. For example, the first holding unit 23D and the second holding unit 23E may be included in a storage unit (not shown) included in the rule generation apparatus 20.

The simple condition candidate generation unit 23B selects one of the plurality of explanatory variables respectively corresponding to a plurality of feature parameters of the examples included in a "division processing target set". The first "division processing target set" is the "training example (training set)" acquired by the acquisition unit 21, and the second and subsequent "division processing target sets" are "subsets" of an "information group (information pair)" received from the condition generation control unit 23A. The "information group" and the "subset" will be described later.

The simple condition candidate generation unit 23B generates a plurality of thresholds for the selected explanatory variable, and generates a plurality of "simple condition candidates" for the selected explanatory variable using the generated plurality of thresholds.

For example, when the example includes three feature parameters (i.e., three explanatory variables) $x_1$, $x_2$, and $x_3$, the simple condition candidate generation unit 23B selects the explanatory variable $x_1$. Then, the simple condition candidate generation unit 23B generates “3”, “5”, and “7” as thresholds of the explanatory variable x_1. Then, the simple condition candidate generation unit 23B generates “x_1>3”, “x_1>5”, and “x_1>7” as the “simple condition candidates”.

The division unit 23C sequentially selects one simple condition candidate as a “use simple condition candidate” from among the plurality of simple condition candidates generated by the simple condition candidate generation unit 23B. The “use simple condition candidate” is a simple condition candidate used for processing of the division unit 23C.

The division unit 23C forms a “first subset” and a “second subset” by dividing a plurality of examples included in the “division processing target set” based on the use simple condition candidates. Then, the division unit 23C outputs, to the first holding unit 23D, an “information set” including a “first information group (first information pair)” in which the use simple condition candidate is associated with the first subset as a “condition set” and a “second information group (second information pair)” in which a negation of the use simple condition candidate is associated with the second subset as a “condition set”. By doing so, the information set for each simple condition candidate generated by the simple condition candidate generation unit 23B is output from the division unit 23C to the first holding unit 23D.

Note that, as described above, the first “division processing target set” is the “training example” acquired by the acquisition unit 21, and the second and subsequent “division processing target sets” are the “subsets” of the “information group” received from the condition generation control unit 23A. In other words, in this specification, a “subset” can be obtained by dividing a “training example”, which is a whole set, using a “condition set”; that is, a “subset” is a partial set of the “training example”. Further, since the condition sets including at least one simple condition are associated with the second and subsequent “division processing target sets”, the condition set of each of the first and the second information groups obtained by these division processing target sets includes at least two or more simple conditions.

The first holding unit 23D temporarily holds a plurality of information sets output from the division unit 23C. Further, the first holding unit 23D outputs and deletes the held information set in accordance with the control by the condition generation control unit 23A.

The condition generation control unit 23A selects, from among the plurality of information sets held in the first holding unit 23D, the information set in which each of the first and the second subsets satisfies a “second constraint” and a “first statistical value” calculated from the first and the second subsets is the smallest statistical value. The “second constraint” includes a constraint that each child node includes at least N (N is a natural number) real example. An example of a case in which N=1 will be described below. That is, since the “division processing target set” is a parent node and each of the first and the second subsets is a child node, it is required for each of the first and the second subsets to include at least one real example. The “second constraint” may also include a constraint that, for each of the first and the second subsets, a difference between an average of the target values of the real examples included in the subset and an average of the target values of the synthetic examples in the subset is less than or equal to a predetermined value. Further, the aforementioned “first statistical value” calculated by the condition generation control unit 23A may be a quantity (e.g., Gini coefficient or entropy) representing an impurity in the case of a classification problem, or a quantity (e.g., a mean squared error or a variance of objective variables) representing the degree of scattering of data in the case of regression. Note that, since the “first statistical value” is used as a reference value when an information set is selected, it can be referred to as an “information set selection reference value”.

The condition generation control unit 23A receives the first and the second information groups of the selected information set from the first holding unit 23D, makes the second holding unit 23E hold them, and then makes the first holding unit 23D delete all the held information sets.

The condition generation control unit 23A determines whether or not each of the first information group and the second information group held in the second holding unit 23E satisfies an “end condition”, and adds “processing completion information” to the information group that satisfies the end condition. The “end condition” may be, for example, the fact that “the number of real examples included in the subset becomes less than or equal to a predetermined number”. Further, the “processing completion information” may be, for example, a flag.

The condition generation control unit 23A acquires, from the second holding unit 23E, the information groups which are held in the second holding unit 23E and to which no processing completion information has been added, and outputs them to the simple condition candidate generation unit 23B and the division unit 23C as the second and subsequent division processing target sets. Then, the condition generation control unit 23A makes the second holding unit 23E delete the acquired information groups.

When the processing completion information has been added to each of the information groups held in the second holding unit 23E, the condition generation control unit 23A acquires all of these information groups from the second holding unit 23E. Then, the condition generation control unit 23A outputs all the acquired information groups to the predicted value generation unit 24. Note that each information group output from the condition generation control unit 23A corresponds to one rule. Further, the condition set and the subset of each information group correspond to the condition set of one rule and the “cluster” corresponding to this one rule. Note that the condition generation control unit 23A may change the form of the condition set of each information group to be output to the predicted value generation unit 24 to the form of a “compound condition” in which a plurality of simple conditions included in the condition set are connected by AND. When the condition set includes only one simple condition, the compound condition is the same as this simple condition. For example, when the condition set includes two simple conditions “X_0>1” and “X_1>4”, the “compound condition” is “X_0>1 AND X_1>4”.

The second holding unit 23E holds the information group received from the condition generation control unit 23A.

The predicted value generation unit 24 generates a predicted value of each of a plurality of rules respectively corresponding to the plurality of information groups output from the condition generation control unit 23A.

For example, the predicted value generation unit 24 includes a divergence value calculation unit 24A, an adjustment unit 24B, and a predicted value calculation unit 24C.

The divergence value calculation unit 24A sequentially selects a “processing target information group” from among the plurality of information groups output from the condition generation control unit 23A. Then, the divergence value calculation unit 24A calculates a divergence value based on a second statistical value related to the target values of the real examples included in a subset (i.e., a processing target subset (processing target cluster)) of the processing target information group and the target value of each of the synthetic examples included in the processing target subset. The "second statistical value" is a "representative value" related to the target values of the real examples included in the "processing target subset (processing target cluster)" of the processing target information group. The "second statistical value" may be, for example, a mean or a median value. The "divergence value" is a quantity representing the degree of divergence in data. For example, the divergence value may be a difference between the "second statistical value" and the target value of the synthetic example, or may be a Kullback-Leibler divergence, a cosine similarity, or the like.

The adjustment unit 24B removes, from the processing target subset, the synthetic example corresponding to the "divergence value" of greater than or equal to a first threshold, thereby adjusting the processing target subset.

The predicted value calculation unit 24C calculates a "third statistical value" related to the target values of all the examples included in the adjusted processing target subset as a "predicted value" of the rule corresponding to the processing target information group of the adjusted processing target subset. In this way, the condition set (compound condition) and the predicted value of the rule corresponding to the processing target information group are prepared. By calculating the "predicted value" of the rule based on the adjusted processing target subset as described above, it is possible to calculate a more accurate predicted value of the rule.

The "third statistical value" is a "representative value" of the target values of all the examples included in the adjusted processing target subset. For example, the "third statistical value" may be an average of the target values of all the examples included in the adjusted processing target subset.

<Operation Example of Rule Generation Apparatus>

An example of a processing operation of the rule generation apparatus 20 having the above-described configuration will be described. The rule generation apparatus 20 performs condition generation processing and then performs predicted value generation processing.

(Condition Generation Processing)

Each of FIGS. 5 to 10 is a flowchart showing an example of the condition generation processing according to the second example embodiment.

The acquisition unit 21 acquires a training example (Step S201).

The simple condition candidate generation unit 23B selects one of a plurality of explanatory variables respectively corresponding to a plurality of feature parameters of the examples included in the training example acquired by the acquisition unit 21 (Step S202).

The simple condition candidate generation unit 23B generates a plurality of thresholds for the selected explanatory variable (Step S203).

The simple condition candidate generation unit 23B generates a simple condition candidate using each of the generated thresholds (Step S204). By doing so, a number of simple condition candidates equal to the number of thresholds generated in Step S203 are generated.

The division unit 23C selects one simple condition candidate as a "use simple condition candidate" from among the plurality of simple condition candidates generated by the simple condition candidate generation unit 23B (Step S205).

The division unit 23C forms a "first subset" and a "second subset" by dividing the training example based on the use simple condition candidate (Step S206). That is, the division unit 23C forms a first subset of the examples included in the training example in which set elements are examples satisfying the use simple condition candidate and a second subset of the examples included in the training example in which set elements are examples satisfying the negation of the use simple condition candidate. Then, the division unit 23C outputs, to the first holding unit 23D, an "information set" including a "first information group" in which the use simple condition candidate is associated with the first subset as a "condition set" and a "second information group" in which the negation of the use simple condition candidate is associated with the second subset as a "condition set". By doing so, the information set for the use simple condition candidate is output from the division unit 23C to the first holding unit 23D, and then is held by the first holding unit 23D. Note that since this division processing is the first division processing, the "training example" is the above-described "division processing target set".

The condition generation control unit 23A determines whether or not each of the first and the second subsets of the information set held in the first holding unit 23D satisfies the "second constraint" (Step S207). As described above, the "second constraint" is, for example, a constraint that each of the first and second subsets of the information set includes at least one real example.

When the second constraint is satisfied (Step S207 YES), the condition generation control unit 23A calculates a "first statistical value" using the first and the second subsets of the information set (Step S208).

When the second constraint is not satisfied (Step S207 NO), the condition generation control unit 23A makes the first holding unit 23D delete the held information set (Step S209).

The condition generation control unit 23A determines whether or not all of the plurality of simple condition candidates generated in Step S204 have been selected as the use simple condition candidates (Step S210). When the condition generation control unit 23A determines that all of the plurality of simple condition candidates have not been selected as the use simple condition candidates (Step S210 NO), the condition generation control unit 23A performs control so as to return the processing step to Step S205. As a result, the division unit 23C selects the simple condition candidate that has not been selected yet as the use simple condition candidate.

When the condition generation control unit 23A determines that all of the simple condition candidates have been selected as the use simple condition candidates (Step S210 YES), the condition generation control unit 23A then determines whether or not the information set held in the first holding unit 23D is present (Step S211). When the condition generation control unit 23A determines that the information set held in the first holding unit 23D is not present (Step S211 NO), the condition generation control unit 23A performs control so as to return the processing step to Step S202.

When the condition generation control unit 23A determines that the information set held in the first holding unit 23D is present (Step S211 YES), the condition generation control unit 23A selects an information set in which the corresponding first statistical value is the smallest statistical value among the information sets held in the first holding unit 23D (Step S212).

The condition generation control unit 23A receives the first and the second information groups of the selected information set from the first holding unit 23D and makes the second holding unit 23E hold them (Step S213). Then, the condition generation control unit 23A makes the first holding unit 23D delete all of the held information sets (Step S213).

The condition generation control unit 23A determines whether or not each of the first and the second information groups held in the second holding unit 23E satisfies the end condition (Step S214).

The condition generation control unit 23A adds a flag to the information group that satisfies the end condition (Step S214 YES, Step S215). When the condition generation control unit 23A determines that neither the first information group nor the second information group satisfies the end condition (Step S214 NO), the processing step proceeds to Step S216.

The condition generation control unit 23A determines whether or not information groups to which the flags have not been added are held in the second holding unit 23E (Step S216).

When information groups to which the flags have not been added are held in the second holding unit 23E (Step S216 YES), the condition generation control unit 23A acquires one information group to which the flag has not been added from the second holding unit 23E and outputs it to the simple condition candidate generation unit 23B and the division unit 23C (Step S217). Then, the condition generation control unit 23A makes the second holding unit 23E delete the acquired information group (Step S217). The subsets of the information group output to the simple condition candidate generation unit 23B and the division unit 23C are the second and subsequent division processing target sets.

The simple condition candidate generation unit 23B selects one of a plurality of explanatory variables respectively corresponding to a plurality of feature parameters of the examples included in the division processing target set (Step S218).

The simple condition candidate generation unit 23B generates a plurality of thresholds for the selected explanatory variable (Step S219).

The simple condition candidate generation unit 23B generates a simple condition candidate using each of the generated thresholds (Step S220). By doing so, a number of simple condition candidates equal to the number of thresholds generated in Step S219 are generated.

The division unit 23C selects one simple condition candidate as a use simple condition candidate from among the plurality of simple condition candidates generated by the simple condition candidate generation unit 23B (Step S221).

The division unit 23C forms a first subset and a second subset by dividing the division processing target set based on the use simple condition candidate (Step S222). That is, the division unit 23C forms a first subset of the examples included in the division processing target set in which set elements are examples satisfying the use simple condition candidate and a second subset of the examples included in the training example in which set elements are examples satisfying the negation of the use simple condition candidate. Then, the division unit 23C outputs, to the first holding unit 23D, an "information set" including a "first information group" in which the use simple condition candidate is associated with the first subset as a "condition set" and a "second information group" in which the negation of the use simple condition candidate is associated with the second subset as a "condition set". By doing so, the information set for the use simple condition candidate is output from the division unit 23C to the first holding unit 23D, and then is held by the first holding unit 23D.

The condition generation control unit 23A determines whether or not each of the first and the second subsets of the information set held in the first holding unit 23D satisfies the "second constraint" (Step S223).

When the second constraint is satisfied (Step S223 YES), the condition generation control unit 23A calculates a "first statistical value" using the first and the second subsets of the information set (Step S224).

When the second constraint is not satisfied (Step S223 NO), the condition generation control unit 23A makes the first holding unit 23D delete the held information set (Step S225).

The condition generation control unit 23A determines whether or not all of the plurality of simple condition candidates generated in Step S220 have been selected as the use simple condition candidates (Step S226). When the condition generation control unit 23A determines that all of the simple condition candidates have not been selected as the use simple condition candidates (Step S226 NO), the condition generation control unit 23A performs control so as to return the processing step to Step S221. As a result, the division unit 23C selects the simple condition candidate that has not been selected yet as the use simple condition candidate.

When the condition generation control unit 23A determines that all of the simple condition candidates have been selected as the use simple condition candidates (Step S226 YES), the condition generation control unit 23A then determines whether or not the information set held in the first holding unit 23D is present (Step S227). When the condition generation control unit 23A determines that the information set held in the first holding unit 23D is not present (Step S227 NO), the condition generation control unit 23A performs control so as to return the processing step to Step S218.

When the condition generation control unit 23A determines that the information set held in the first holding unit 23D is present (Step S227 YES), the condition generation control unit 23A selects an information set in which the corresponding first statistical value is the smallest statistical value among the information sets held in the first holding unit 23D (Step S228).

The condition generation control unit 23A receives the first and the second information groups of the selected information set from the first holding unit 23D and makes the second holding unit 23E hold them (Step S229). Then, the condition generation control unit 23A makes the first holding unit 23D delete all of the held information sets (Step S229).

The condition generation control unit 23A determines whether or not each of the first and the second information groups held in the second holding unit 23E satisfies the end condition (Step S230).

The condition generation control unit 23A adds a flag to the information group that satisfies the end condition (Step S230 YES, Step S231). When the condition generation control unit 23A determines that neither the first information group nor the second information group satisfies the end condition (Step S230 NO), the processing step proceeds to Step S216.

The condition generation control unit 23A determines whether or not information groups to which the flags have not been added are held in the second holding unit 23E (Step S216).

When the processing completion information has been added to each of the information groups held in the second holding unit 23E (Step S216 NO), the condition generation control unit 23A acquires all of these information groups from the second holding unit 23E and outputs them to the predicted value generation unit 24 (Step S232). Note that the condition generation control unit 23A may change the form of the condition set of each information group to be output to the predicted value generation unit 24 to the form of a "compound condition" in which a plurality of simple conditions included in the condition set are connected by AND.

FIG. 11 is a diagram for explaining a processing result of the condition generation processing. In FIG. 11, when a training example is set as a division processing target set, a subset B2 satisfying the end condition is obtained by a negation "$x_0 \leq 1$" of a simple condition "$x_0 > 1$". Further, when a subset B1 is set as the division processing target set, a subset C1 satisfying the end condition is obtained by a simple condition "$x_1 > 5$" and a subset C2 satisfying the end condition is obtained by a negation "$x_1 \leq 5$" of the simple condition "$x_1 > 5$". At this time, the condition generation control unit 23A outputs three information groups shown in FIG. 11 to the predicted value generation unit 24. That is, the three information groups are an information group of the subset "B2" and a compound condition "$x_0 \leq 1$", an information group of the subset "C1" and a compound condition "$x_0 > 1$ AND $x_1 > 5$", and an information group of the subset "C2" and a compound condition "$x_0 > 1$ AND $x_1 \leq 5$".

(Predicted Value Generation Processing)

Figure 12:
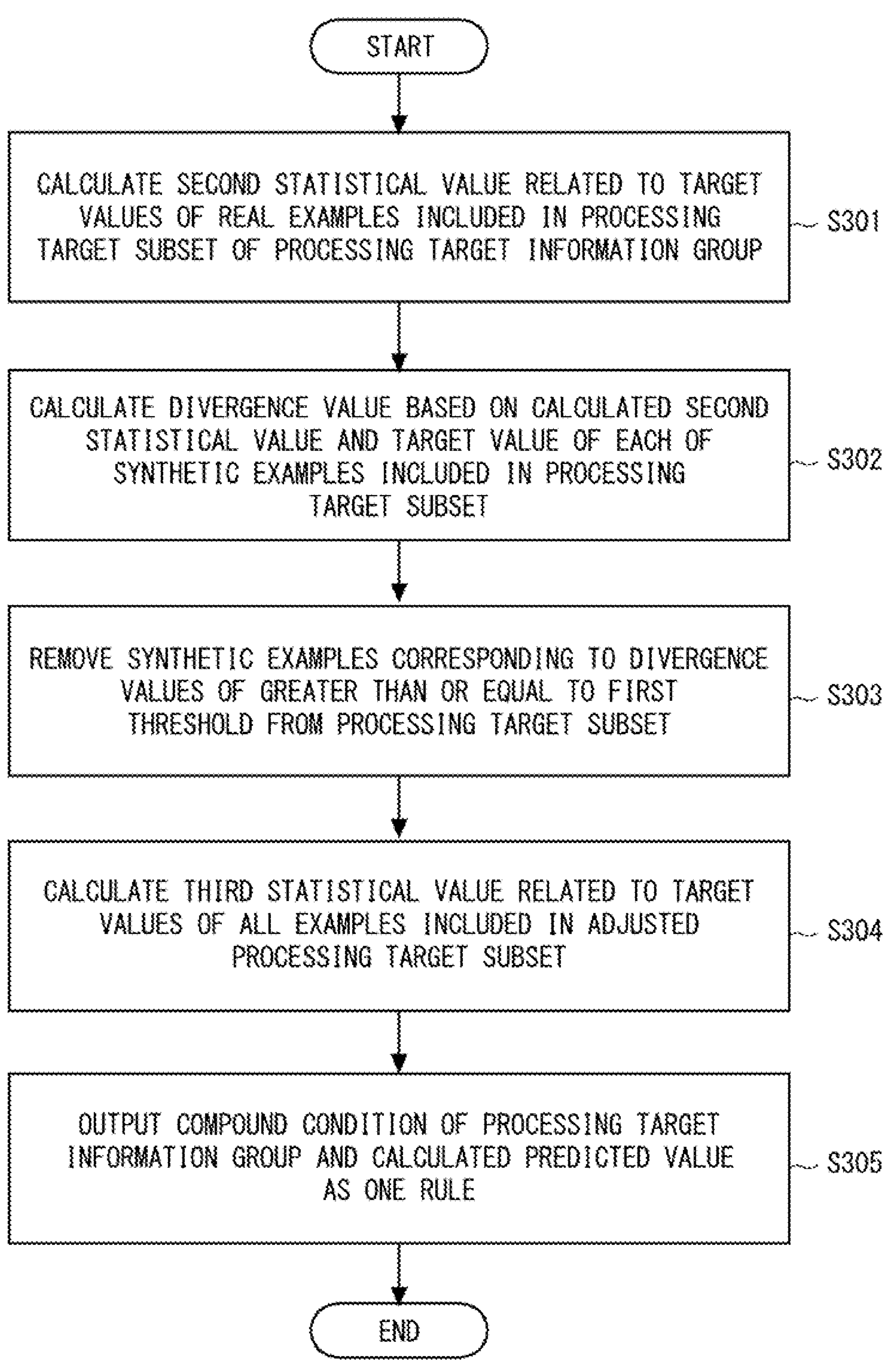
FIG. 12 is a flowchart showing an example of predicted value generation processing according to the second example embodiment.

FIG. 12 is a flowchart showing an example of predicted value generation processing according to the second example embodiment. The processing shown in the flowchart in FIG. 12 is executed for each of a plurality of information groups output from the condition generation control unit 23A. That is, each of the information groups serves as a "processing target information group" in turn.

The divergence value calculation unit 24A calculates the second statistical value related to the target values of the real examples included in the subset of the processing target information group (the processing target subset) (Step S301).

The divergence value calculation unit 24A calculates a divergence value based on the calculated second statistical value and the target value of each of the synthetic examples included in the processing target subset (Step S302).

The adjustment unit 24B removes synthetic examples corresponding to the "divergence values" of greater than or equal to the first threshold from the processing target subset (Step S303). By doing so, the adjusted processing target subset can be obtained.

The predicted value calculation unit 24C calculates a third statistical value related to the target values of all the examples included in the adjusted processing target subset (Step S304). This third statistical value is a "predicted value" of the rule corresponding to the processing target information group of the adjusted processing target subset.

The predicted value calculation unit 24C outputs the compound condition of the processing target information group and the calculated predicted value as one rule (Step S305). Therefore, by repeating the flow shown in FIG. 12 for a plurality of information groups, the above "rule group" is output.

Third Example Embodiment

A third example embodiment relates to variations of a method for generating a predicted value.

<Example of Configuration of Rule Generation Apparatus>

Figure 13:
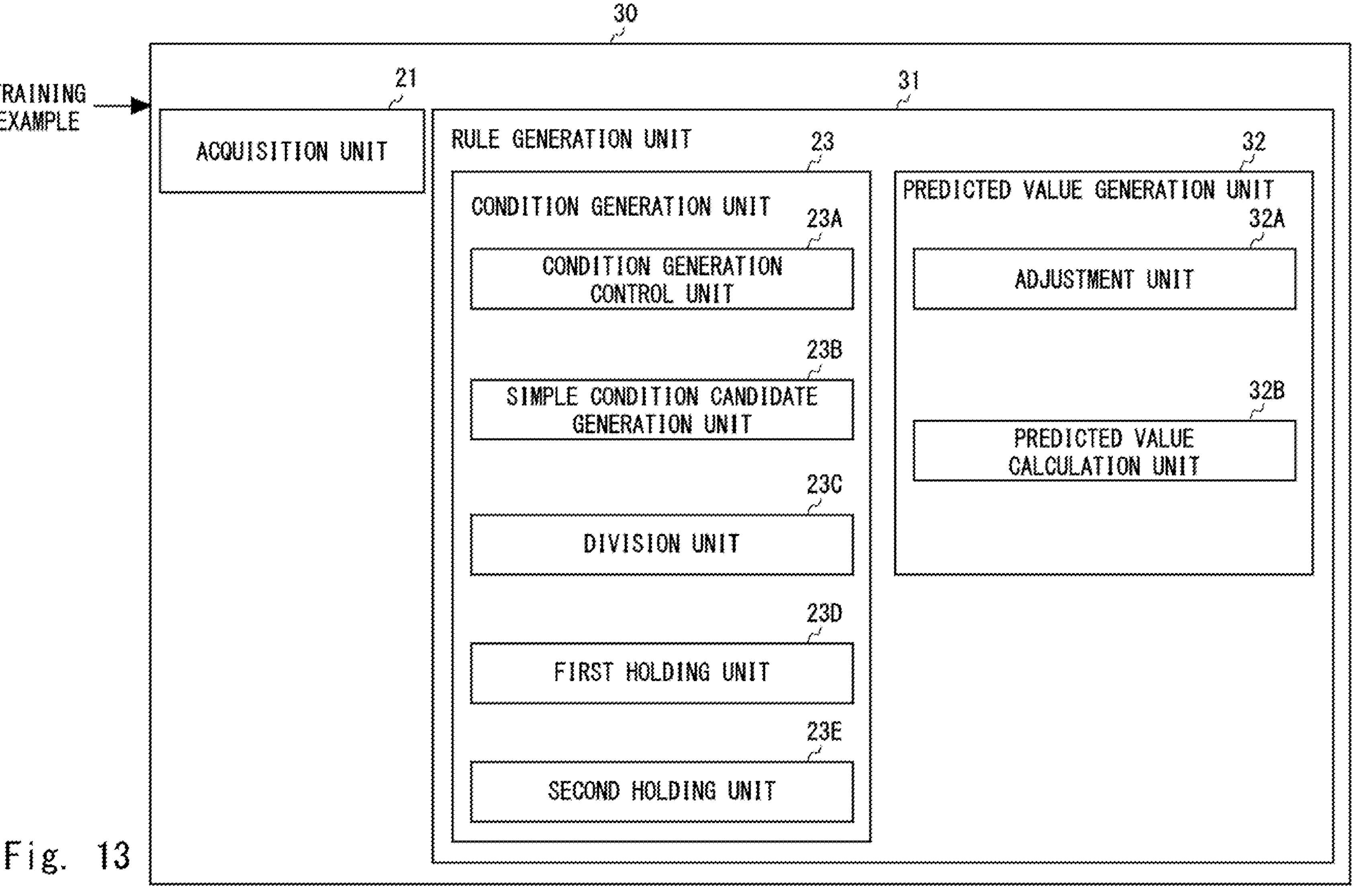
FIG. 13 is a block diagram showing an example of a rule generation apparatus according to a third example embodiment.

FIG. 13 is a block diagram showing an example of a rule generation apparatus according to the third example embodiment. In FIG. 13, a rule generation apparatus 30 includes the acquisition unit 21 and a rule generation unit 31. Note that the rule generation apparatus 30 is applicable to both regression and classification problems.

The rule generation unit 31 includes the condition generation unit 23 and a predicted value generation unit 32. The predicted value generation unit 32 generates a predicted value of each of a plurality of rules respectively corresponding to the plurality of information groups output from the condition generation control unit 23A.

For example, the predicted value generation unit 32 includes an adjustment unit 32A and a predicted value calculation unit 32B.

The adjustment unit 32A sequentially selects a "processing target information group" from among the plurality of information groups output from the condition generation control unit 23A. Then, the adjustment unit 32A adjusts the processing target subset by removing, from the processing target subset, synthetic examples included in the processing target subset of the processing target information group.

The predicted value calculation unit 32B calculates a "second statistical value" related to the target values of all the examples (i.e., the real examples) included in the adjusted processing target subset as a "predicted value" of the rule corresponding to the processing target information group of the adjusted processing target subset. The "second statistical value" may be, for example, a mean or a median value. By calculating the "predicted value" of the rule based on the adjusted processing target subset as described above, it is possible to calculate a more accurate predicted value of the rule.

<Operation Example of Rule Generation Apparatus>

An example of a processing operation of the rule generation apparatus 20 having the above-described configuration will be described.

(Predicted Value Generation Processing)

Figure 14:
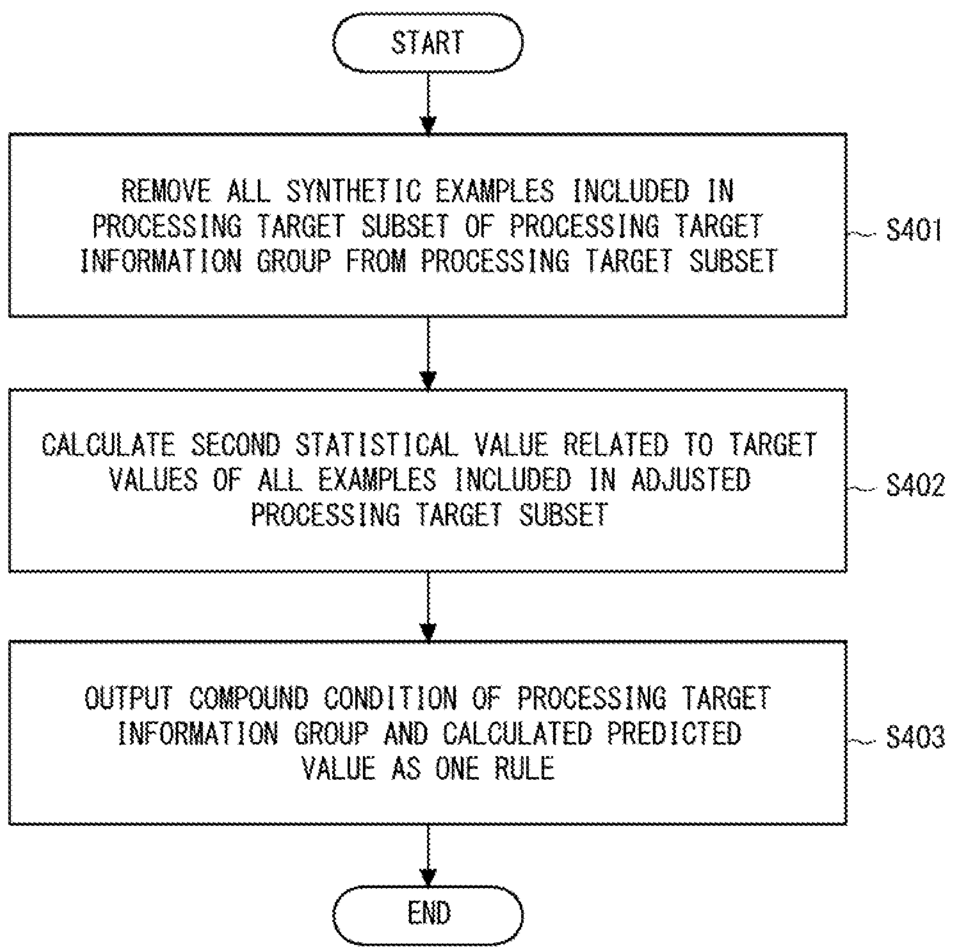
FIG. 14 is a flowchart showing an example of predicted value generation processing according to the third example embodiment.

FIG. 14 is a flowchart showing an example of predicted value generation processing according to the third example embodiment. The processing shown in the flowchart in FIG. 14 is executed for each of a plurality of information groups output from the condition generation control unit 23A. That is, each of the information groups serves as a "processing target information group" in turn.

The adjustment unit 32A removes all synthetic examples included in the processing target subset of the processing target information group from the processing target subset (Step S401). By doing so, the adjusted processing target subset can be obtained.

The predicted value calculation unit 32B calculates a "second statistical value" related to the target values of all the examples included in the adjusted processing target subset (Step S402). This second statistical value is a predicted value of the rule corresponding to the processing target information group of the adjusted processing target subset.

The predicted value calculation unit 32B outputs the compound condition of the processing target information group and the calculated predicted value as one rule (Step S403). Therefore, by repeating the flow shown in FIG. 14 for a plurality of information groups, the above "rule group" is output.

Note that, in the above description, a predicted value is calculated using the processing target subset obtained by the adjustment processing by the adjustment unit 32A. However, this example embodiment is not limited thereto. For example, the predicted value generation unit 32 may not include the adjustment unit 32A. In short, the predicted value calculation unit 32B only needs to be able to calculate the second statistical value related to the target values of the real examples included in the processing target subset of the processing target information group as a predicted value of the rule corresponding to the processing target information group of the processing target subset.

Fourth Example Embodiment

A fourth example embodiment relates to variations of a method for generating a condition. In the fourth example embodiment, unlike in the second example embodiment, a training example is divided into leaf nodes without imposing the second constraint, and leaf nodes that do not include at least N (N is a natural number) real example are deleted. An example of a case in which N=1 will be described below.

<Example of Configuration of Rule Generation Apparatus>

Figure 15:
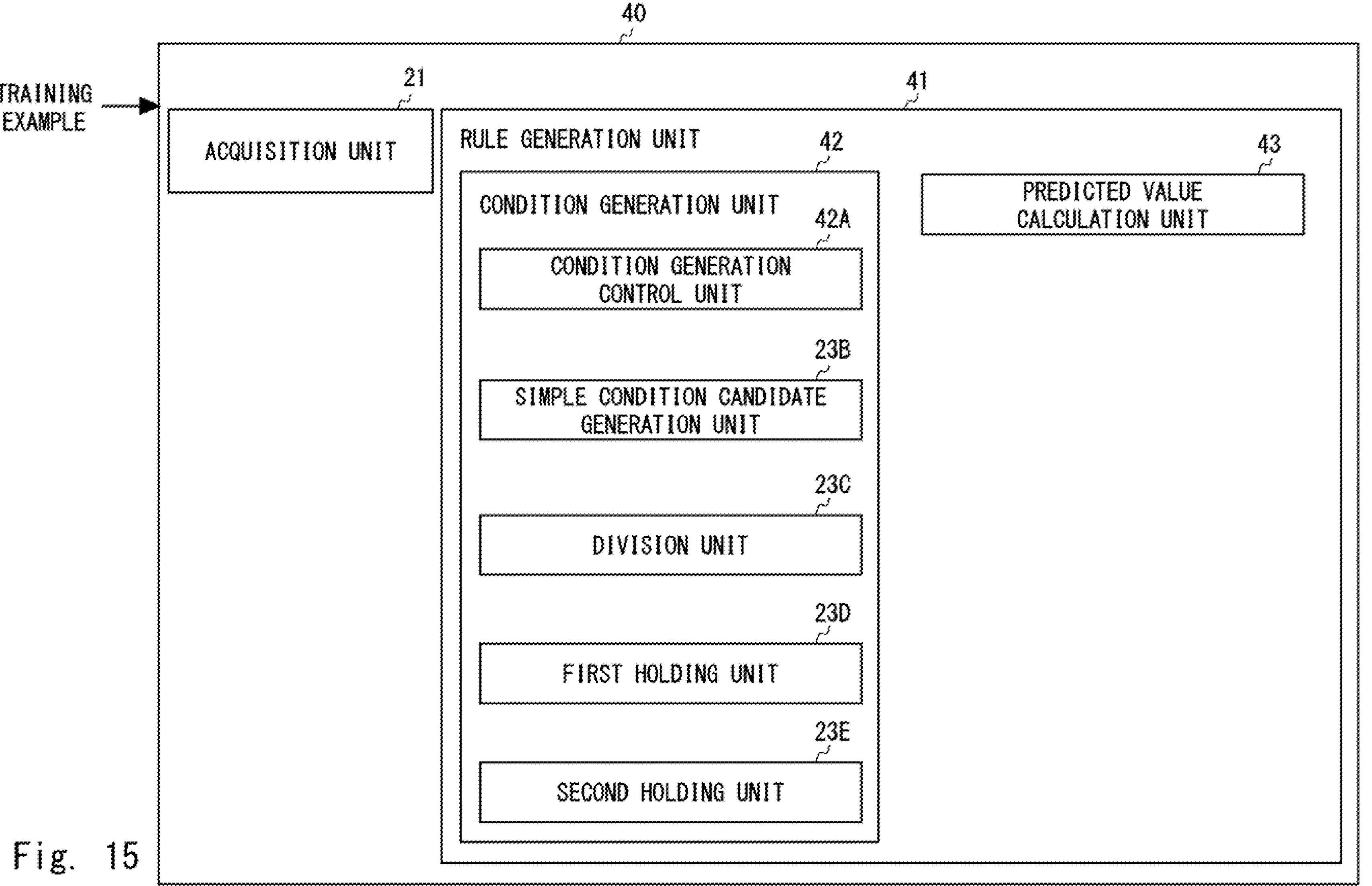
FIG. 15 is a block diagram showing an example of a rule generation apparatus according to a fourth example embodiment.
Figure 17:
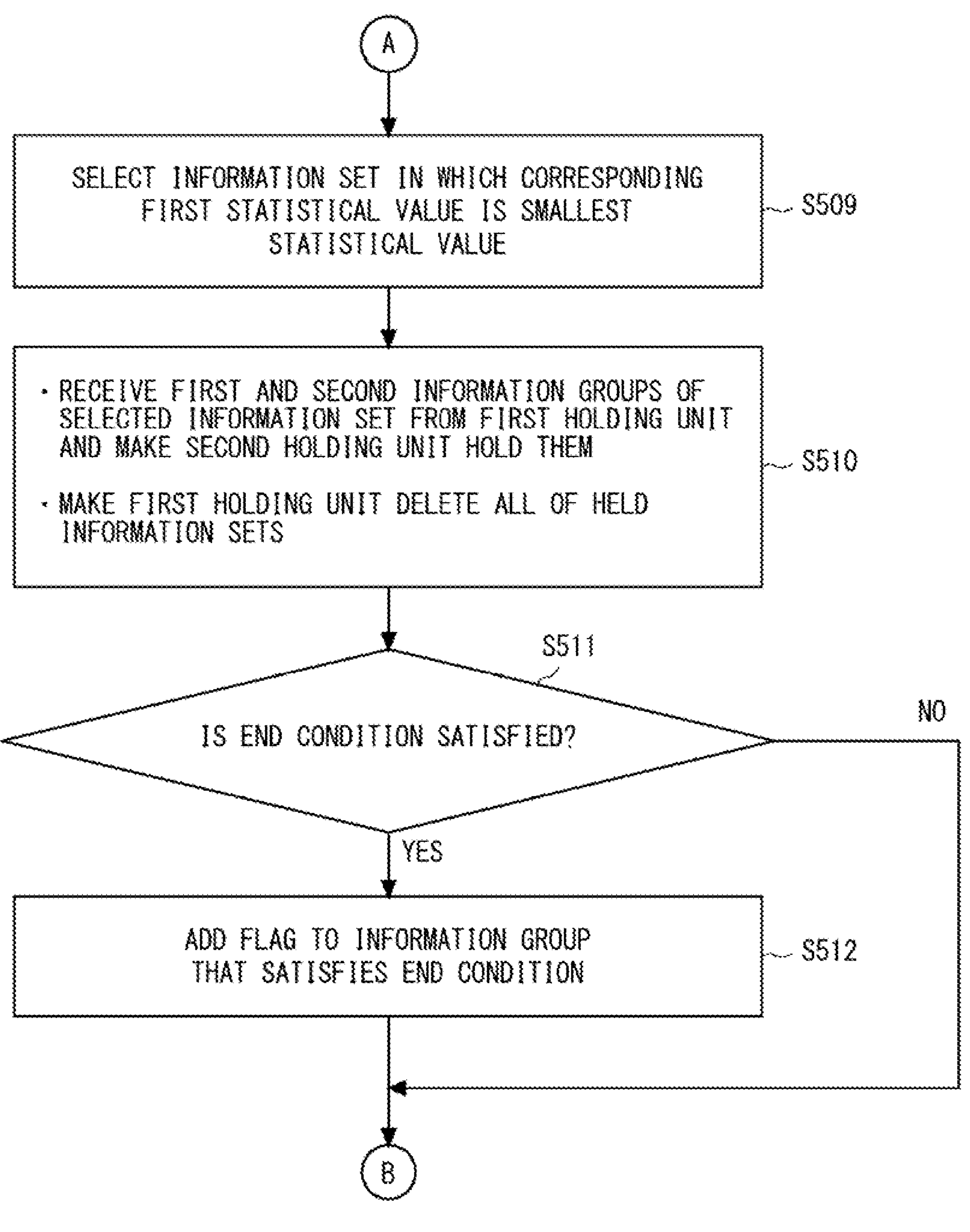
FIG. 17 is a flowchart showing an example of the condition generation processing according to the fourth example embodiment.
Figure 18:
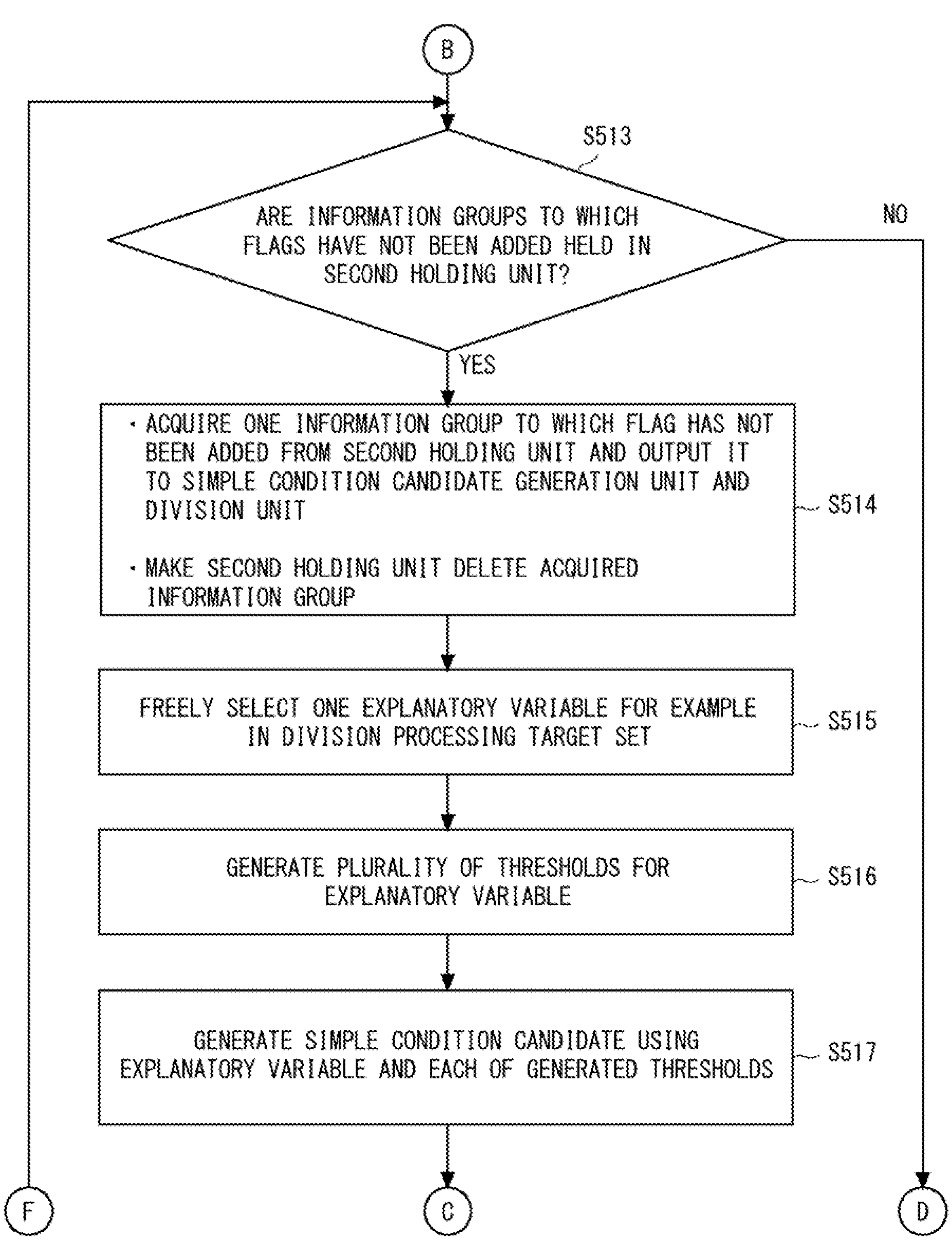
FIG. 18 is a flowchart showing an example of the condition generation processing according to the fourth example embodiment.
Figure 19:
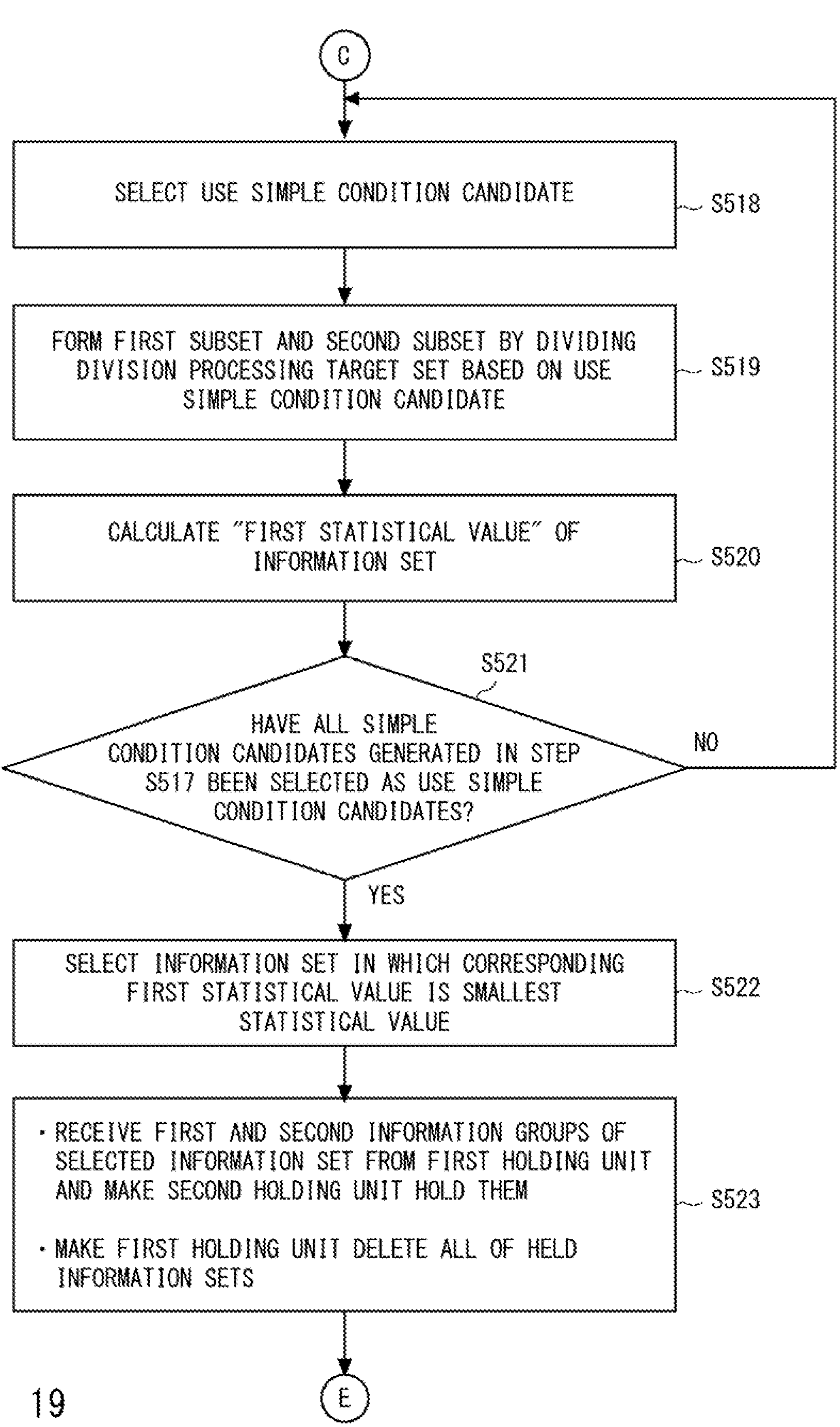
FIG. 19 is a flowchart showing an example of the condition generation processing according to the fourth example embodiment.
Figure 20:
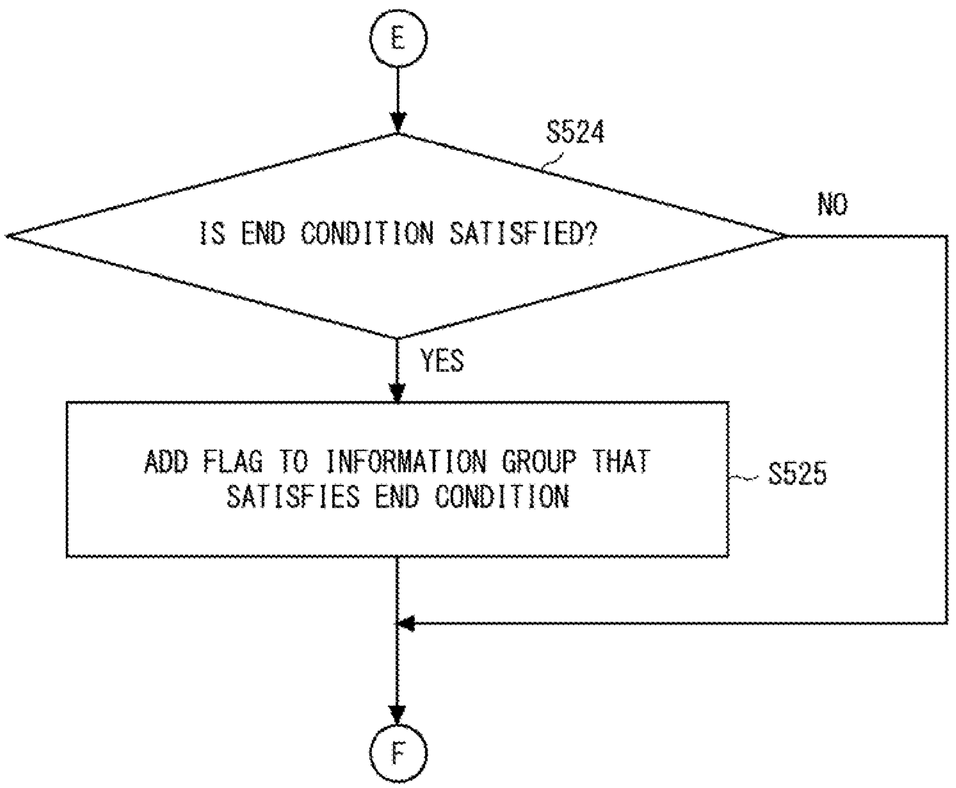
FIG. 20 is a flowchart showing an example of the condition generation processing according to the fourth example embodiment.
Figure 21:
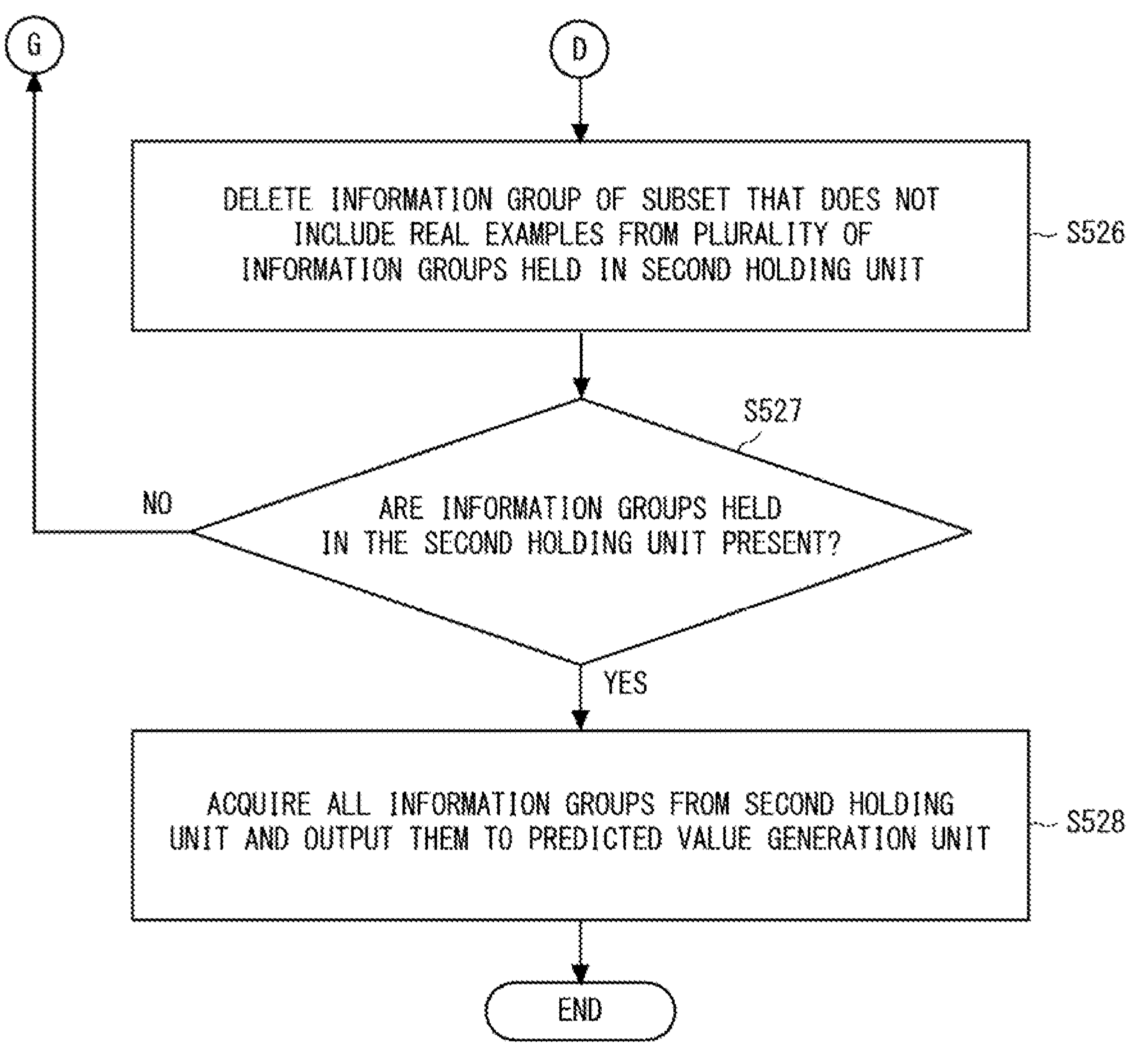
FIG. 21 is a flowchart showing an example of the condition generation processing according to the fourth example embodiment.

FIG. 15 is a block diagram showing an example of a rule generation apparatus according to the fourth example embodiment. In FIG. 15, a rule generation apparatus 40 includes the acquisition unit 21 and a rule generation unit 41. Note that the rule generation apparatus 40 is applicable to both regression and classification problems.

The rule generation unit 41 includes a condition generation unit 42 and a predicted value generation unit 43.

For example, the condition generation unit 42 includes a condition generation control unit 42A, the simple condition candidate generation unit 23B, the division unit 23C, the first holding unit 23D, and the second holding unit 23E. Note that, although a description is given in accordance with the assumption that the first holding unit 23D and the second holding unit 23E are included in the condition generation unit 42, this example embodiment is not limited thereto. For example, the first holding unit 23D and the second holding unit 23E may be included in a storage unit (not shown) included in the rule generation apparatus 40.

The condition generation control unit 42A selects, from among the plurality of information sets held in the first holding unit 23D, the information set in which a "first statistical value" calculated from the first and the second subsets is the smallest statistical value.

The condition generation control unit 42A receives the first and the second information groups of the selected information set from the first holding unit 23D, makes the second holding unit 23E hold them, and then makes the first holding unit 23D delete all the held information sets.

The condition generation control unit 42A determines whether or not each of the first information group and the second information group held in the second holding unit 23E satisfies an "end condition", and adds "processing completion information" to the information group that satisfies the end condition.

The condition generation control unit 42A acquires, from the second holding unit 23E, the information groups which are held in the second holding unit 23E and to which no processing completion information has been added, and outputs them to the simple condition candidate generation unit 23B and the division unit 23C as the second and subsequent division processing target sets. Then, the condition generation control unit 42A makes the second holding unit 23E delete the acquired information groups.

When the processing completion information has been added to each of the information groups held in the second holding unit 23E, the condition generation control unit 42A deletes the information group of the subset that does not include real examples from a plurality of information groups held in the second holding unit 23E. As described above, in the fourth example embodiment, unlike in the second example embodiment, a training example is divided into leaf nodes without imposing the second constraint, and the leaf nodes that do not include real examples are deleted. In this way, a rule satisfying the first constraint can still be generated. Further, the condition generation control unit 42A acquires all the information groups that are not deleted and remain in the second holding unit 23E and outputs them to the predicted value generation unit 43.

A configuration of the predicted value generation unit 43 may be the same as that of the predicted value generation unit 24 according to the second example embodiment, or may be the same as that of the predicted value generation unit 32 according to the third example embodiment.

<Operation Example of Rule Generation Apparatus>

An example of a processing operation of the rule generation apparatus 40 having the above-described configuration will be described.

(Condition Generation Processing)

Each of FIGS. 16 to 21 is a flowchart showing an example of condition generation processing according to the fourth example embodiment.

The processing of Steps S501 to S506 is the same as the processing of Steps S201 to S206.

The condition generation control unit 42A calculates a "first statistical value" using the first and the second subsets of the information set held in the first holding unit 23D (Step S507).

The condition generation control unit 42A determines whether or not all of the plurality of simple condition candidates generated in Step S504 have been selected as the use simple condition candidates (Step S508). When the condition generation control unit 42A determines that all of the simple condition candidates have not been selected as the use simple condition candidates (Step S508 NO), the condition generation control unit 42A performs control so as to return the processing step to Step S505. As a result, the division unit 23C selects the simple condition candidate that has not been selected yet as the use simple condition candidate.

When the condition generation control unit 42A determines that all of the simple condition candidates have been selected as the use simple condition candidates (Step S508 YES), the condition generation control unit 42A selects an information set in which the corresponding first statistical value is the smallest statistical value among the information sets held in the first holding unit 23D (Step S509).

The condition generation control unit 42A receives the first and the second information groups of the selected information set from the first holding unit 23D and makes the second holding unit 23E hold them (Step S510). Then, the condition generation control unit 23A makes the first holding unit 23D delete all of the held information sets (Step S510).

The condition generation control unit 42A determines whether or not each of the first and the second information groups held in the second holding unit 23E satisfies the end condition (Step S511).

The condition generation control unit 42A adds a flag to the information group that satisfies the end condition (Step S511 YES, Step S512). When the condition generation control unit 42A determines that neither the first information group nor the second information group satisfies the end condition (Step S511 NO), the processing step proceeds to Step S513.

The condition generation control unit 42A determines whether or not information groups to which the flags have not been added are held in the second holding unit 23E (Step S513).

When information groups to which the flags have not been added are held in the second holding unit 23E (Step S513 YES), the condition generation control unit 42A acquires one information group to which the flag has not been added from the second holding unit 23E and outputs it to the simple condition candidate generation unit 23B and the division unit 23C (Step S514). Then, the condition generation control unit 42A makes the second holding unit 23E delete the acquired information groups (Step S514). The subsets of the information groups output to the simple condition candidate generation unit 23B and the division unit 23C are the second and subsequent division processing target sets.

The processing of Steps S515 to S519 is the same as the processing of Steps S218 to S222.

The condition generation control unit 42A calculates a "first statistical value" using the first and the second subsets of the information set held in the first holding unit 23D (Step S520).

The condition generation control unit 42A determines whether or not all of the plurality of simple condition candidates generated in Step S517 have been selected as the use simple condition candidates (Step S521). When the condition generation control unit 42A determines that all of the simple condition candidates have not been selected as the use simple condition candidates (Step S512 NO), the condition generation control unit 42A performs control so as to return the processing step to Step S518. As a result, the division unit 23C selects the simple condition candidate that has not been selected yet as the use simple condition candidate.

When the condition generation control unit 42A determines that all of the simple condition candidates have been selected as the use simple condition candidates (Step S521 YES), the condition generation control unit 42A selects an information set in which the corresponding first statistical value is the smallest statistical value among the information sets held in the first holding unit 23D (Step S522).

The condition generation control unit 42A receives the first and the second information groups of the selected information set from the first holding unit 23D and makes the second holding unit 23E hold them (Step S523). Then, the condition generation control unit 23A makes the first holding unit 23D delete all of the held information sets (Step S523).

The condition generation control unit 42A determines whether or not each of the first and the second information groups held in the second holding unit 23E satisfies the end condition (Step S524).

The condition generation control unit 42A adds a flag to the information group that satisfies the end condition (Step S524 YES, Step S525). When the condition generation control unit 42A determines that neither the first information group nor the second information group satisfies the end condition (Step S524 NO), the processing step proceeds to Step S513.

The condition generation control unit 42A determines whether or not information groups to which the flags have not been added are held in the second holding unit 23E (Step S513).

When the condition generation control unit 42A determines that the flags have been added to all the information groups held in the second holding unit 23E (Step S513 YES), the condition generation control unit 42A deletes the information group of the subset that does not include real examples from a plurality of information groups held in the second holding unit 23E (Step S526).

The condition generation control unit 42A determines whether or not any information groups held in the second holding unit 23E is present (Step S527). When no information group held in the second holding unit 23E is present (Step S527 NO), the processing step returns to Step S502.

When information groups held in the second holding unit 23E are present (Step S527 YES), the condition generation control unit 42A acquires all the information groups held in the second holding unit 23E and outputs them to the predicted value generation unit 43 (Step S528). Note that the condition generation control unit 42A may change the form of the condition set of each information group to be output to the predicted value generation unit 43 to the form of a "compound condition" in which a plurality of simple conditions included in the condition set are connected by AND.

Other Example Embodiments

<1> In the descriptions of the first to the fourth example embodiments, the case in which regression is applied has been focused on. In the case of class classification, the appearance probability of the class may be calculated as a predicted value of the rule. When a decision tree is used, the class in which the appearance probability of a class to which the real examples included in the leaf node belong is high may be used as a predicted value of the rule.

Figure 22:
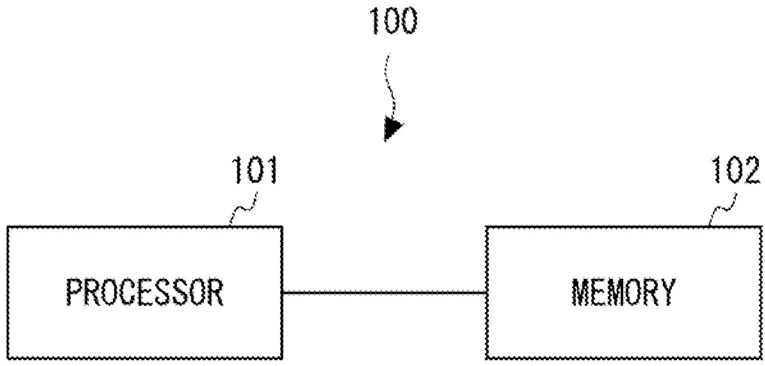
FIG. 22 is a diagram showing an example of a hardware configuration of a rule generation apparatus.

<2> FIG. 22 is a diagram showing an example of a hardware configuration of a rule generation apparatus. In FIG. 22, a rule generation apparatus 100 includes a processor 101 and a memory 102. The processor 101 may be, for example, a microprocessor, a Micro Processing Unit (MPU), or a Central Processing Unit (CPU). The processor 101 may include a plurality of processors. The memory 102 is composed of a combination of a volatile memory and a non-volatile memory. The memory 102 may include a storage located apart from the processor 101. In this case, the processor 101 may access the memory 102 via an I/O interface (not shown).

Each of the rule generation apparatuses 10, 20, 30, and 40 according to the first to the fourth example embodiments can have the hardware configuration shown in FIG. 22. The acquisition units 11 and 21 and the rule generation units 12, 22, 31, and 41 of the rule generation apparatus 10, 20, 30, and 40 according to the first to the fourth example embodiments may be implemented by the processor 101 loading and executing the program stored in the memory 102. The aforementioned storage unit (not shown) may be implemented by the memory 102. The program can be stored and provided to the rule generation apparatuses 10, 20, 30, and 40 using any type of non-transitory computer readable media. Examples of non-transitory computer readable media include magnetic storage media (e.g., flexible disks, magnetic tapes, and hard disk drives), optical magnetic storage media (e.g., magneto-optical disks). Further, examples of non-transitory computer readable media include CD-ROM (Read Only Memory), CD-R, and CD-R/W. Further, examples of non-transitory computer readable media include semiconductor memories. The semiconductor memories include, for example, mask ROM, PROM (Programmable ROM), EPROM (Erasable PROM), flash ROM, RAM (Random Access Memory), etc. Further, the program may be provided to the rule generation apparatuses 10, 20, 30, and 40 using any type of transitory computer readable media. Examples of transitory computer readable media include electric signals, optical signals, and electromagnetic waves. Transitory computer readable media can provide the program to the rule generation apparatuses 10, 20, 30, and 40 via a wired communication line (e.g., electric wires, and optical fibers) or a wireless communication line.

Although the present invention has been described with reference to the example embodiments, the present invention is not limited to the above-described example embodiments. Various changes that may be understood by those skilled in the art may be made to the configurations and details of the present invention within the scope of the invention.

Some or all of the above example embodiments may also be described as the following supplementary notes, but are not limited to the following.

(Supplementary Note 1)

A rule generation apparatus comprising:

acquisition means for acquiring a training example including a plurality of examples, wherein the plurality of examples include at least one real example and at least one synthetic example, each of the real example and the synthetic example includes a feature value vector of which vector elements are one or a plurality of feature values corresponding to feature parameters different from each other, and a target value, and the feature value and the target value included in each of the real examples are measured values, while each of the synthetic examples is an example formed based on the real example; and rule generation means for generating a rule group for dividing the training example into a plurality of clusters related to the target values using a rule base model so that a first constraint is satisfied, wherein each of rules in the rule group includes a condition obtained from a condition set including at least one simple condition related to the feature parameters and a predicted value related to the target values, wherein the first constraint includes a constraint that each of the clusters includes at least N (N is a natural number) real example.

(Supplementary Note 2)

The rule generation apparatus according to Supplementary note 1, wherein the rule generation means comprises:

condition generation means for generating a condition for each of the rules; and predicted value generation means for generating a predicted value of each of the rules.

(Supplementary Note 3)

The rule generation apparatus according to Supplementary note 2, wherein the condition generation means comprises condition generation control means for determining a simple condition for dividing a parent node into a plurality of child nodes in accordance with a second constraint, the second constraint including a constraint that each of the child nodes includes at least N (N is a natural number) real example.

(Supplementary Note 4)

The rule generation apparatus according to Supplementary note 2, wherein the condition generation means further comprises:

condition generation control means;

simple condition candidate generation means for selecting one of a plurality of explanatory variables respectively corresponding to a plurality of the feature parameters of examples included in a division processing target set and generating a plurality of thresholds using the selected explanatory variable, thereby generating a plurality of simple condition candidates for the selected explanatory variable; and division means for sequentially selecting one simple condition candidate from among the plurality of generated simple condition candidates as a use simple condition candidate to be used for processing, forming a first subset and a second subset by dividing a plurality of the examples included in the division processing target set based on the use simple condition candidate, and outputting, for each of the simple condition candidates, an information set including a first information group in which the use simple condition candidate is associated with the first subset as a condition set and a second information group in which a negation of the use simple condition candidate is associated with the second subset as a condition set and then storing the information sets in first holding means, the first division processing target set is the training example, the condition generation control means:

selects, from a plurality of the stored information sets, the information set in which each of the first and the second subsets satisfies the second constraint and a first statistical value calculated from the first and the second subsets is the smallest statistical value;

makes a second holding means hold the first information group and the second information group of the selected information set and then makes the first holding means delete the stored information set;

determines whether or not each of the held first and second information groups satisfies an end condition and then adds processing completion information to the information group that satisfies the end condition; and acquires from the second holding means, as the second and subsequent division processing target sets, the information groups which are held in the second holding means and to which no processing completion information has been added and outputs the acquired information groups to the simple condition candidate generation means, and the second constraint includes a constraint that each of the first and the second subsets includes at least N (N is a natural number) real example.

(Supplementary Note 5)

The rule generation apparatus according to Supplementary note 4, wherein when the processing completion information has been added to each of the information groups held in the second holding means, the condition generation control means acquires all the information groups from the second holding means and outputs the acquired information groups.

(Supplementary Note 6)

The rule generation apparatus according to Supplementary note 2, wherein the condition generation means further comprises:

condition generation control means;

simple condition candidate generation means for selecting one of a plurality of explanatory variables respectively corresponding to a plurality of the feature parameters of examples included in a division processing target set and generating a plurality of thresholds using the selected explanatory variable, thereby generating a plurality of simple condition candidates for the selected explanatory variable; and division means for sequentially selecting one simple condition candidate from among the plurality of generated simple condition candidates as a use simple condition candidate to be used for processing, forming a first subset and a second subset by dividing a plurality of the examples included in the division processing target set based on the use simple condition candidate, and outputting, for each of the simple condition candidates, an information set including a first information group in which the use simple condition candidate is associated with the first subset as a condition set and a second information group in which a negation of the use simple condition candidate is associated with the second subset as a condition set and then storing the information sets in first holding means, the first division processing target set is the training example, and the condition generation control means:

selects, from a plurality of the stored information sets, the information set in which a first statistical value calculated from the first and the second subsets is the smallest statistical value;

makes a second holding means hold the first information group and the second information group of the selected information set and then makes the first holding means delete the stored information set;

determines whether or not each of the held first and second information groups satisfies an end condition and then adds processing completion information to the information group that satisfies the end condition;

acquires from the second holding means, as the second and subsequent division processing target sets, the information groups which are held in the second holding means and to which no processing completion information has been added and outputs the acquired information groups to the simple condition candidate generation means;

deletes, when the processing completion information has been added to each of the information groups held in the second holding means, the information group of the subset that does not include at least N (N is a natural number) real example from a plurality of the information groups held in the second holding means; and acquires all the information groups that are not deleted and remain in the second holding means and outputs the acquired information groups.

(Supplementary Note 7)

The rule generation apparatus according to Supplementary note 5 or 6, wherein the predicted value generation means comprises:

divergence value calculation means for sequentially selecting a processing target information group from among a plurality of the information groups output from the condition generation control means and calculating a divergence value based on a second statistical value related to target values of real examples included in a processing target subset of the processing target information group and a target value of each of synthetic examples included in the processing target subset;

adjustment means for removing, from the processing target subset, the synthetic example corresponding to the calculated divergence value of greater than or equal to a first threshold, thereby adjusting the processing target subset; and predicted value calculation means for calculating a third statistical value related to the target values of all the examples included in the adjusted processing target subset as a predicted value of the rule corresponding to the processing target information group of the adjusted processing target subset.

(Supplementary Note 8)

The rule generation apparatus according to Supplementary note 5 or 6, wherein the predicted value generation means comprises predicted value calculation means for sequentially selecting a processing target information group from among a plurality of the information groups output from the condition generation control means and calculating a second statistical value related to target values of real examples included in a processing target subset of the processing target information group as a predicted value of the rule corresponding to the processing target information group of the processing target subset.

(Supplementary Note 9)

The rule generation apparatus according to any one of Supplementary notes 1 to 8, wherein the rule base model is a decision tree or a decision list.

(Supplementary Note 10)

A rule generation method comprising acquiring a training example including a plurality of examples, wherein the plurality of examples include at least one real example and at least one synthetic example, each of the real example and the synthetic example includes a feature value vector of which vector elements are one or a plurality of feature values corresponding to feature parameters different from each other, and a target value, and the feature value and the target value included in each of the real examples are measured values, while each of the synthetic examples is an example formed based on the real example, the rule generation method further comprising generating a rule group for dividing the training example into a plurality of clusters related to the target values using a rule base model so that a first constraint is satisfied, wherein each of rules in the rule group includes a condition obtained from a condition set including at least one simple condition related to the feature parameters and a predicted value related to the target values, wherein the first constraint includes a constraint that each of the clusters includes at least N (N is a natural number) real example.

(Supplementary Note 11)

A non-transitory computer readable medium storing a control program for causing a rule generation apparatus to perform processing comprising acquiring a training example including a plurality of examples, wherein the plurality of examples include at least one real example and at least one synthetic example, each of the real example and the synthetic example includes a feature value vector of which vector elements are one or a plurality of feature values corresponding to feature parameters different from each other, and a target value, and the feature value and the target value included in each of the real examples are measured values, while each of the synthetic examples is an example formed based on the real example, the processing further comprising generating a rule group for dividing the training example into a plurality of clusters related to the target values using a rule base model so that a first constraint is satisfied, wherein each of rules in the rule group includes a condition obtained from a condition set including at least one simple condition related to the feature parameters and a predicted value related to the target values, wherein the first constraint includes a constraint that each of the clusters includes at least N (N is a natural number) real example.

REFERENCE SIGNS LIST

10 RULE GENERATION APPARATUS
11 ACQUISITION UNIT
12 RULE GENERATION UNIT
20 RULE GENERATION APPARATUS
21 ACQUISITION UNIT
22 RULE GENERATION UNIT
23 CONDITION GENERATION UNIT
23A CONDITION GENERATION CONTROL UNIT
23B SIMPLE CONDITION CANDIDATE GENERATION UNIT
23C DIVISION UNIT
23D FIRST HOLDING UNIT
23E SECOND HOLDING UNIT
24 PREDICTED VALUE GENERATION UNIT
24A DIVERGENCE VALUE CALCULATION UNIT
24B ADJUSTMENT UNIT
24C PREDICTED VALUE CALCULATION UNIT
30 RULE GENERATION APPARATUS
31 RULE GENERATION UNIT
32 PREDICTED VALUE GENERATION UNIT
32A ADJUSTMENT UNIT
32B PREDICTED VALUE CALCULATION UNIT
40 RULE GENERATION APPARATUS
41 RULE GENERATION UNIT
42 CONDITION GENERATION UNIT
42A CONDITION GENERATION CONTROL UNIT
43 PREDICTED VALUE GENERATION UNIT

The invention claimed is:

1. A rule generation apparatus comprising:

at least one memory storing instructions, and at least one processor configured to execute, according to the instructions, a process comprising:

acquiring a training set including a plurality of examples, wherein the plurality of examples include at least one real example and at least one synthetic example, each of the real example and the synthetic example includes a feature value vector of which vector elements are one or more feature values corresponding to feature parameters different from each other, and a target value, and the feature value and the target value included in each of the real examples are measured values, while each of the synthetic examples is an example formed based on the real example; and generating a rule group for dividing the training set into a plurality of clusters related to the target values using a rule base model so that a first constraint is satisfied, wherein each of rules in the rule group includes a condition obtained from a condition set including at least one simple condition related to the feature parameters and a predicted value related to the target values, wherein the first constraint includes a constraint that each cluster includes at least N (N is a natural number) real examples, wherein the generating the rule group comprises:

generating a condition for each of the rules; and generating a predicted value of each of the rules, and wherein the generating the condition further comprises:

selecting one of a plurality of explanatory variables respectively corresponding to a plurality of the feature parameters of examples included in a division processing target set and generating a plurality of thresholds using the selected explanatory variable, thereby generating a plurality of simple condition candidates for the selected explanatory variable; and sequentially selecting one simple condition candidate from among the plurality of generated simple condition candidates as a use simple condition candidate to be used for processing, forming a first subset and a second subset by dividing a plurality of the examples included in the division processing target set based on the use simple condition candidate, and outputting, for each of the simple condition candidates, an information set including a first information group in which the use simple condition candidate is associated with the first subset as a condition set and a second information group in which a negation of the use simple condition candidate is associated with the second subset as a condition set and then storing the information sets in a first storage, the first division processing target set is the training set, the generating the condition further comprises:

selecting, from a plurality of the stored information sets, the information set in which each of the first and the second subsets satisfies the second constraint and a first statistical value calculated from the first and the second subsets is the smallest statistical value;

making a second storage hold the first information group and the second information group of the selected information set and then making the first storage delete the stored information set;

determining whether or not each of the held first and second information groups satisfies an end condition and then adding processing completion information to the information group that satisfies the end condition; and acquiring from the second storage, as the second and subsequent division processing target sets, the information groups which are held in the second storage and to which no processing completion information has been added, and the second constraint includes a constraint that each of the first and the second subsets includes at least N (N is a natural number) real examples.

2. The rule generation apparatus according to claim 1, wherein the generating the condition comprises determining a simple condition for dividing a parent node into a plurality of child nodes in accordance with a second constraint, the second constraint including a constraint that each of the child nodes includes at least N (N is a natural number) real examples.

3. The rule generation apparatus according to claim 1, wherein when the processing completion information has been added to each of the information groups held in the second storage, the generating the condition further comprises acquiring all the information groups from the second storage and outputting the acquired information groups.

4. The rule generation apparatus according to claim 3, wherein the generating the predicted value comprises:

sequentially selecting a processing target information group from among a plurality of the information groups output and calculating a divergence value based on a second statistical value related to target values of real examples included in a processing target subset of the processing target information group and a target value of each of synthetic examples included in the processing target subset;

removing, from the processing target subset, the synthetic example corresponding to the calculated divergence value of greater than or equal to a first threshold, thereby adjusting the processing target subset; and calculating a third statistical value related to the target values of all the examples included in the adjusted processing target subset as a predicted value of the rule corresponding to the processing target information group of the adjusted processing target subset.

5. The rule generation apparatus according to claim 3, wherein the generating the predicted value comprises sequentially selecting a processing target information group from among a plurality of the information groups output and calculating a second statistical value related to target values of real examples included in a processing target subset of the processing target information group as a predicted value of the rule corresponding to the processing target information group of the processing target subset.

6. The rule generation apparatus according to claim 1, wherein the rule base model is a decision tree or a decision list.

7. A rule generation apparatus comprising:

at least one memory storing instructions, and at least one processor configured to execute, according to the instructions, a process comprising:

acquiring a training set including a plurality of examples, wherein the plurality of examples include at least one real example and at least one synthetic example, each of the real example and the synthetic example includes a feature value vector of which vector elements are one or more feature values corresponding to feature parameters different from each other, and a target value, and the feature value and the target value included in each of the real examples are measured values, while each of the synthetic examples is an example formed based on the real example; and generating a rule group for dividing the training set into a plurality of clusters related to the target values using a rule base model so that a first constraint is satisfied, wherein each of rules in the rule group includes a condition obtained from a condition set including at least one simple condition related to the feature parameters and a predicted value related to the target values, wherein the first constraint includes a constraint that each cluster includes at least N (N is a natural number) real examples, wherein the generating the rule group comprises:

generating a condition for each of the rules; and generating a predicted value of each of the rules, and wherein the generating the condition further comprises:

selecting one of a plurality of explanatory variables respectively corresponding to a plurality of the feature parameters of examples included in a division processing target set and generating a plurality of thresholds using the selected explanatory variable, thereby generating a plurality of simple condition candidates for the selected explanatory variable; and selecting one simple condition candidate from among the plurality of generated simple condition candidates as a use simple condition candidate to be used for processing, forming a first subset and a second subset by dividing a plurality of the examples included in the division processing target set based on the use simple condition candidate, and outputting, for each of the simple condition candidates, an information set including a first information group in which the use simple condition candidate is associated with the first subset as a condition set and a second information group in which a negation of the use simple condition candidate is associated with the second subset as a condition set and then storing the information sets in a first storage, the first division processing target set is the training set, and the generating the condition further comprises:

selecting, from a plurality of the stored information sets, the information set in which a first statistical value calculated from the first and the second subsets is the smallest statistical value;

making a second storage hold the first information group and the second information group of the selected information set and then making the first storage delete the stored information set;

determining whether or not each of the held first and second information groups satisfies an end condition and then adding processing completion information to the information group that satisfies the end condition;

acquiring from the second storage, as the second and subsequent division processing target sets, the information groups which are held in the second storage and to which no processing completion information has been added;

deleting, when the processing completion information has been added to each of the information groups held in the second storage, the information group of the subset that does not include at least N (N is a natural number) real examples from a plurality of the information groups held in the second storage; and acquiring all the information groups that are not deleted and remain in the second storage and outputting the acquired information groups.

8. A rule generation method comprising acquiring a training set including a plurality of examples, wherein the plurality of examples include at least one real example and at least one synthetic example, each of the real example and the synthetic example includes a feature value vector of which vector elements are one or more feature values corresponding to feature parameters different from each other, and a target value, and the feature value and the target value included in each of the real examples are measured values, while each of the synthetic examples is an example formed based on the real example, the rule generation method further comprising generating a rule group for dividing the training set into a plurality of clusters related to the target values using a rule base model so that a first constraint is satisfied, wherein each of rules in the rule group includes a condition obtained from a condition set including at least one simple condition related to the feature parameters and a predicted value related to the target values, wherein the first constraint includes a constraint that each cluster includes at least N (N is a natural number) real examples, wherein the generating the rule group comprises:

generating a condition for each of the rules; and generating a predicted value of each of the rules, and wherein the generating the condition further comprises:

selecting one of a plurality of explanatory variables respectively corresponding to a plurality of the feature parameters of examples included in a division processing target set and generating a plurality of thresholds using the selected explanatory variable, thereby generating a plurality of simple condition candidates for the selected explanatory variable; and sequentially selecting one simple condition candidate from among the plurality of generated simple condition candidates as a use simple condition candidate to be used for processing, forming a first subset and a second subset by dividing a plurality of the examples included in the division processing target set based on the use simple condition candidate, and outputting, for each of the simple condition candidates, an information set including a first information group in which the use simple condition candidate is associated with the first subset as a condition set and a second information group in which a negation of the use simple condition candidate is associated with the second subset as a condition set and then storing the information sets in a first storage, the first division processing target set is the training set, the generating the condition further comprises:

selecting, from a plurality of the stored information sets, the information set in which each of the first and the second subsets satisfies the second constraint and a first statistical value calculated from the first and the second subsets is the smallest statistical value;

making a second storage hold the first information group and the second information group of the selected information set and then making the first storage delete the stored information set;

determining whether or not each of the held first and second information groups satisfies an end condition and then adding processing completion information to the information group that satisfies the end condition; and acquiring from the second storage, as the second and subsequent division processing target sets, the information groups which are held in the second storage and to which no processing completion information has been added, and the second constraint includes a constraint that each of the first and the second subsets includes at least N (N is a natural number) real examples.

* * * * *